United States Patent
Wada et al.

(10) Patent No.: US 12,130,200 B2
(45) Date of Patent: Oct. 29, 2024

(54) FAILURE DIAGNOSIS APPARATUS, TRAINING APPARATUS, TRAINING METHOD, AND FAILURE DIAGNOSIS SYSTEM

(71) Applicant: Mitsubishi Electric Corporation, Tokyo (JP)

(72) Inventors: Yasuhiko Wada, Tokyo (JP); Kazunori Sakanobe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 122 days.

(21) Appl. No.: 18/042,506

(22) PCT Filed: Oct. 13, 2020

(86) PCT No.: PCT/JP2020/038607
§ 371 (c)(1),
(2) Date: Feb. 22, 2023

(87) PCT Pub. No.: WO2022/079796
PCT Pub. Date: Apr. 21, 2022

(65) Prior Publication Data
US 2023/0324258 A1 Oct. 12, 2023

(51) Int. Cl.
*G01M 13/04* (2019.01)
*G01N 3/56* (2006.01)
(Continued)

(52) U.S. Cl.
CPC .............. *G01M 13/04* (2013.01); *G01N 3/56* (2013.01); *H02P 21/14* (2013.01); *H02P 27/06* (2013.01); *H02P 29/024* (2013.01)

(58) Field of Classification Search
CPC .......... G01M 13/04; G01N 3/56; H02P 21/14; H02P 27/06; H02P 29/024; H02P 6/18; H02P 29/028; H02P 23/0018
(Continued)

(56) References Cited

U.S. PATENT DOCUMENTS 10,715,074 B2 * 7/2020 Tsugawa ............... B60L 3/0061
2020/0073301 A1 3/2020 Sakai et al.

FOREIGN PATENT DOCUMENTS

EP  3648338 A1  5/2020
EP  3681035 A1  7/2020
(Continued)

OTHER PUBLICATIONS

International Search Report of the International Searching Authority mailed Dec. 22, 2020 for the corresponding international application No. PCT/JP2020/038607 (and English translation).

*Primary Examiner* — David Luo
(74) *Attorney, Agent, or Firm* — Posz Law Group, PLC

(57) ABSTRACT

A failure diagnosis apparatus includes a controller to control drive of a motor, a wear estimator to estimate an amount of wear of a bearing of the motor based on a current that flows in the motor, and a failure notification unit to diagnose a failure of the motor based on the amount of wear of the bearing of the motor estimated by the wear estimator and to notify a user. When the wear estimator estimates the amount of wear of the bearing of the motor, the controller controls drive of the motor such that the motor is driven in a constant state.

12 Claims, 18 Drawing Sheets

(51) Int. Cl.
*H02P 21/14* (2016.01)
*H02P 27/06* (2006.01)
*H02P 29/024* (2016.01)

(58) Field of Classification Search
USPC ........ 318/490, 801, 800, 799, 798, 767, 727
See application file for complete search history.

(56) References Cited

FOREIGN PATENT DOCUMENTS

| | | |
|---|---|---|
| JP | 6397302 B2 | 9/2018 |
| JP | 2020-38313 A | 3/2020 |
| WO | 2019/003389 A1 | 1/2019 |
| WO | 2019/049188 A1 | 3/2019 |

* cited by examiner (a)

| WEAR ESTIMATION AMOUNT W_est [μm] | EXEMPLARY REPRESENTATION BY FAILURE NOTIFICATION UNIT (●●●●) |
|---|---|
| 0 | 12 MONTHS |
| 20 | 10 MONTHS |
| 40 | 8 MONTHS |
| 60 | 6 MONTHS |
| 80 | 4 MONTHS |
| 100 | 2 MONTHS |

| WEAR ESTIMATION AMOUNT W_est [$\mu$m] | DIAGNOSIS TIMING (Fs ISSUANCE TIMING) |
|---|---|
| 0 | 30 DAYS |
| 20 | 7 DAYS |
| 40 | 3 DAYS |
| 60 | 1 DAY |
| 80 | 12 HOURS |
| 100 | 1 HOUR |

FAILURE DIAGNOSIS APPARATUS, TRAINING APPARATUS, TRAINING METHOD, AND FAILURE DIAGNOSIS SYSTEM

CROSS REFERENCE TO RELATED APPLICATION

This application is a U.S. national stage application of International Patent Application No. PCT/JP2020/038607 filed on Oct. 13, 2020, the disclosure of which is incorporated herein by reference.

TECHNICAL FIELD

The present disclosure relates to a failure diagnosis apparatus to diagnose a failure of a motor, a training apparatus, a training method, and a failure diagnosis system.

BACKGROUND

Most of failures of a compressor on which a motor including a bearing is mounted originate from deterioration of the bearing of the motor or break of the bearing. When the compressor is used with the bearing of the motor having been worn and deteriorated, the motor stops due to deterioration, which results in long downtime (stop time period) in operations of the compressor and lowering in availability of the compressor.

Before the bearing of the motor is worn and deteriorated, deterioration of the bearing of the motor is sensed and appropriate measures such as repair are taken for the deteriorated bearing of the motor. Then, the downtime of the compressor can be reduced or shortened and availability of the compressor can be improved. PTL 1 describes a failure diagnosis apparatus to estimate a plurality of degrees of deterioration of a machine to be diagnosed, by applying a plurality of quantities of state of the machine to be diagnosed to a mathematical model representing relation among a plurality of degrees of deterioration of equipment, the plurality of quantities of state, and a plurality of parameters representing sensitivity.

PATENT LITERATURE

PTL 1: Japanese Patent No. 6397302

PTL 1, however, is silent about in which drive state of the motor the degree of deterioration (amount of wear) is to be estimated. If the degree of deterioration of the bearing of the motor is estimated while the motor is driven to accelerate or decelerate, an error originating from the state of drive of the motor is caused in the estimated degree of deterioration and accuracy in diagnosis of a failure becomes poor. When accuracy in diagnosis of the failure becomes poor, the failure diagnosis apparatus may erroneously diagnose the bearing of the motor as having been deteriorated and downtime during which the compressor is stopped for maintenance works may be caused.

SUMMARY

The present disclosure was made to solve problems as above, and an object thereof is to provide a failure diagnosis apparatus, a training apparatus, a training method, and a failure diagnosis system that allow accurate estimation of a failure of a motor so as to suppress unexpected downtime and do appropriate maintenance works.

A failure diagnosis apparatus according to the present disclosure diagnoses a failure of a motor to drive equipment. The failure diagnosis apparatus includes a controller to control drive of the motor, a wear estimator to estimate wear information of a bearing of the motor based on a current that flows in the motor, and a failure notification unit to diagnose a failure of the motor based on the wear information of the bearing of the motor estimated by the wear estimator and to notify a user. When the wear estimator estimates the wear information of the bearing of the motor, the controller controls drive of the motor such that the motor is driven in a constant state.

According to the present disclosure, wear of the bearing of the motor can accurately be estimated, so that unexpected downtime can be suppressed and appropriate maintenance works can be done.

BRIEF DESCRIPTION OF DRAWINGS

FIG. 9 is a diagram illustrating exemplary timing of issuance of diagnosis timing.

DETAILED DESCRIPTION

Figure 1:
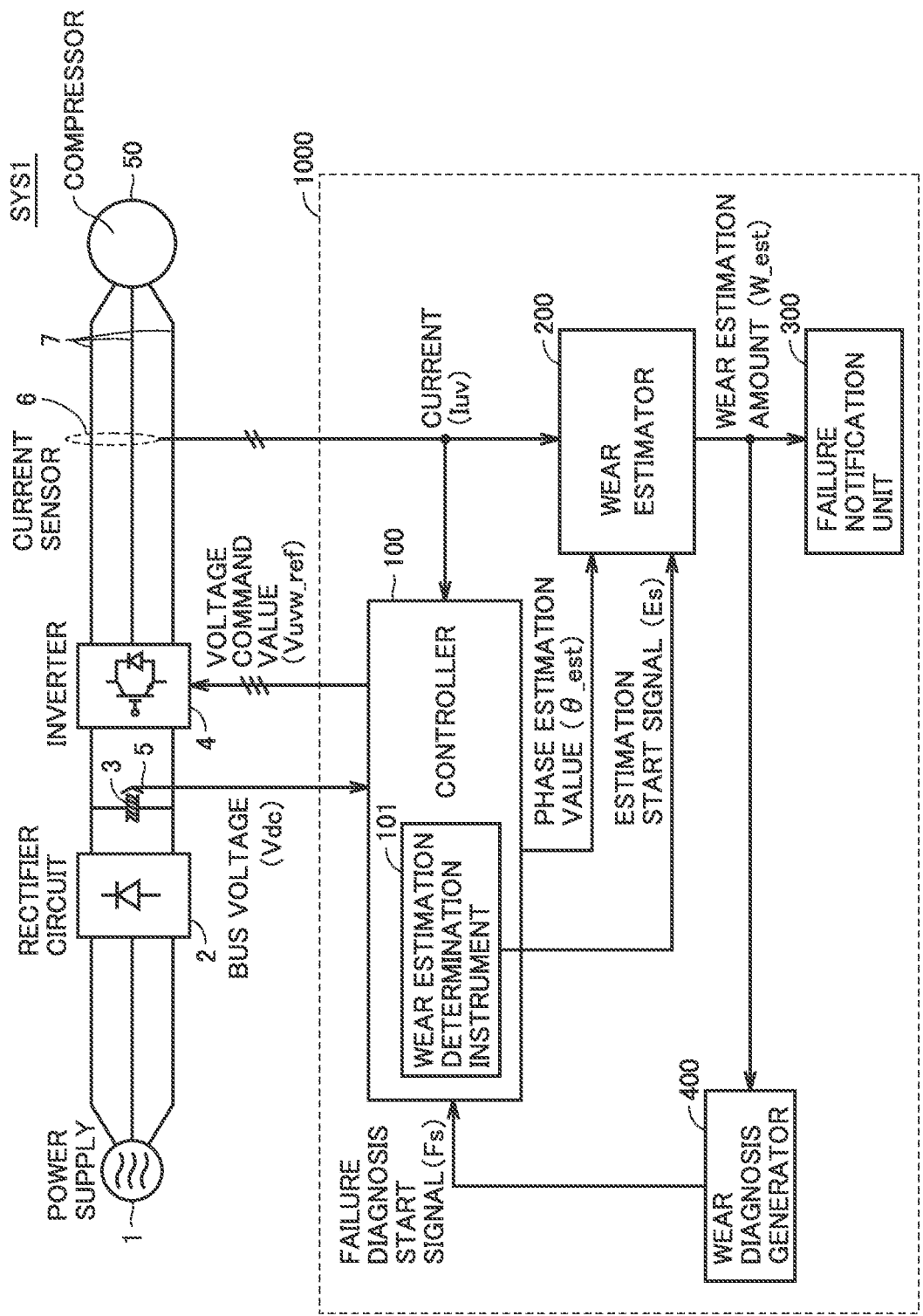
FIG. 1 is a block diagram for illustrating an exemplary configuration of a failure diagnosis system in a first embodiment.

A failure diagnosis apparatus, a training apparatus, a training method, and a failure diagnosis system according to an embodiment will be described below with reference to the drawings. The same or corresponding elements in the drawings have the same reference characters allotted and they are assumed as elements common in all embodiments which will be described below.

Forms of constituent elements represented in all embodiments which will be described below are illustrative and not limited to the forms which will be described below. In particular, combination of constituent elements is not limited only to combination in the embodiments and a constituent element described in another embodiment can be applied to a different embodiment. Furthermore, magnitude of parameters such as a pressure and a temperature is not determined particularly based on relation with an absolute value but relatively determined by a state or an operation of an apparatus or the like.

First Embodiment

A failure diagnosis system SYS1 in a first embodiment will be described with reference to the drawings. FIG. 1 is a block diagram for illustrating an exemplary configuration of failure diagnosis system SYS1 in the first embodiment. Failure diagnosis system SYS1 shown FIG. 1 includes a compressor 50 including a motor (not shown) a failure of which is to be diagnosed and a failure diagnosis apparatus 1000 to diagnose a failure of the motor.

The configuration to drive compressor 50 includes an alternating-current (AC) power supply 1, a rectifier circuit 2, an electrolytic capacitor 3, and an inverter 4. Rectifier circuit 2 converts three-phase (U-, V-, and W-phase) AC power from AC power supply 1 into direct-current (DC) power. Electrolytic capacitor 3 smoothens DC power from rectifier circuit 2. Inverter 4 converts DC power from rectifier circuit 2 into three-phase AC power and outputs three-phase AC power to compressor 50. A voltage sensor 5 detects a bus voltage Vdc applied to electrolytic capacitor 3. A current sensor 6 is provided at some midpoint in a line 7 extending from inverter 4 to compressor 50 and detects currents of two phases (for example, a current Iu and a current Iv) of three-phase AC that flows from inverter 4 to compressor 50.

Furthermore, the configuration to drive compressor 50 includes a controller 100 to control drive of compressor 50. Controller 100 outputs a voltage command value (Vuvw_ref) to inverter 4 based on a result of detection by voltage sensor 5 and current sensor 6 to drive compressor 50 under pulse width modulation (PWM) control. In the first embodiment, controller 100 not only controls drive of compressor 50 but also functions as a part of the configuration of failure diagnosis apparatus 1000.

Failure diagnosis apparatus 1000 includes controller 100, a wear estimator 200, a failure notification unit 300, and a wear diagnosis generator 400. Failure diagnosis apparatus 1000 can be implemented by hardware such as a computer to execute various programs, and for example, a central processing unit (CPU), a field-programmable gate array (FPGA), or the like is employed as a computing entity to perform various types of processing.

Controller 100 includes a wear estimation determination instrument 101. Controller 100 outputs an estimation start signal Es and a phase estimation value θ_est to wear estimator 200 based on a failure diagnosis start signal Fs from wear diagnosis generator 400, bus voltage Vdc from voltage sensor 5, and currents Iuv of two phases of three-phase AC. Phase estimation value θ_est refers to a value resulting from estimation by controller 100, of a rotation speed of the motor based on the currents of two phases of three-phase AC detected by current sensor 6.

Wear estimator 200 estimates a degree of deterioration (amount of wear) of the bearing of the motor to drive compressor 50 based on the currents of two phases of three-phase AC, estimation start signal Es, and phase estimation value θ_est. Though the amount of wear of the bearing of the motor below will be described by way of example of the degree of deterioration of the bearing of the motor, limitation thereto is not intended. Wear estimator 200 defines the estimated amount of wear as a wear estimation amount W_est and outputs the wear estimation amount to failure notification unit 300 and wear diagnosis generator 400. The amount of wear of the bearing of the motor is one piece of information among pieces of wear information. Though an example in which the degree of deterioration of the bearing of the motor is estimated based on the currents of two phases of three-phase AC is described in the present disclosure, limitation to three-phase AC is not intended, and the degree of deterioration of the bearing of the motor may be estimated based on currents of three phases or a current of one phase of three-phase AC.

Failure notification unit 300 gives a notification about timing of replacement of compressor 50 based on wear estimation amount W_est estimated by wear estimator 200. Wear diagnosis generator 400 outputs failure diagnosis start signal Fs to start estimation of wear of the bearing of the motor to wear estimation determination instrument 101 of controller 100 in accordance with wear estimation amount W_est estimated by wear estimator 200.

Figure 2:
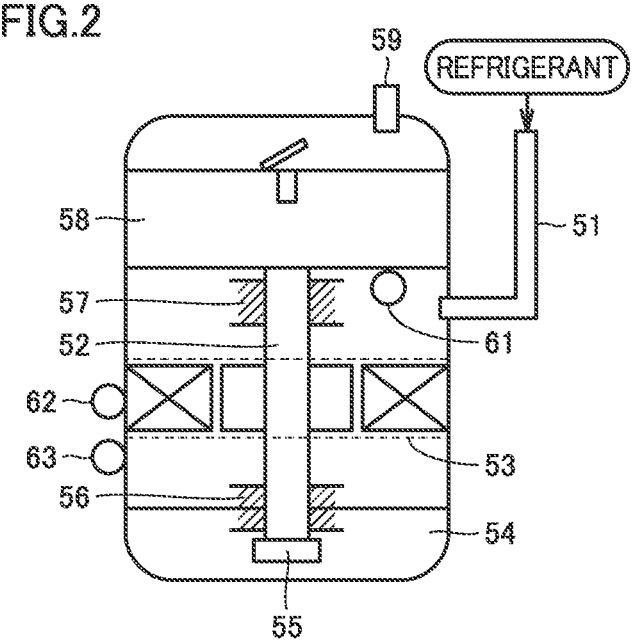
FIG. 2 is a cross-sectional view showing an exemplary internal structure of a compressor.

An exemplary internal structure of compressor 50 will now be described. FIG. 2 is a cross-sectional view showing an exemplary internal structure of compressor 50. Compressor 50 shown in FIG. 2 includes a suction pipe 51, a main spindle 52, a motor 53, lubricating oil 54, an oil pump 55, a sub bearing 56, a main bearing 57, a compression mechanism 58, and a discharge pipe 59. Compressor 50 composes a part of air-conditioning equipment and forms a refrigeration cycle to compress refrigerant that flows through a pipe. Refrigerant is suctioned through suction pipe 51 of compressor 50 and discharged through discharge pipe 59.

Suction pipe 51 is a pipe for suction of refrigerant at a low temperature and a low pressure into compressor 50. A pressure sensor, a temperature sensor, a humidity sensor, or the like may be attached to suction pipe 51 to measure a pressure, a temperature, a humidity, or the like of refrigerant that flows through the pipe. Such sensors may be attached to pipes in the air-conditioning equipment to estimate a pressure, a temperature, a humidity, or the like of refrigerant that flows through suction pipe 51.

Though not shown, motor 53 is connected to a three-phase AC power line and driven in accordance with a voltage applied by inverter 4. Main spindle 52 is connected to motor 53 and transfers rotational energy to compression mechanism 58. Lubricating oil 54 is accumulated at the bottom of compressor 50, and is supplied to sub bearing 56 and main spindle 52 by oil pump 55 to lubricate sub bearing 56 and main spindle 52. For checking an amount of lubricating oil 54, a liquid level sensor capable of sensing an oil level of lubricating oil 54 may be attached to measure the amount of lubricating oil 54.

Discharge pipe 59 is a pipe for discharging refrigerant at a high temperature and a high pressure compressed by compression mechanism 58 to the outside of compressor 50. A pressure sensor, a temperature sensor, a humidity sensor, or the like may be attached to discharge pipe 59 to measure a pressure, a temperature, a humidity, or the like of refrigerant that flows through the pipe. Such sensors may be attached to pipes in the air-conditioning equipment to estimate a pressure, a temperature, a humidity, or the like of refrigerant that flows through discharge pipe 59.

Figure 3:
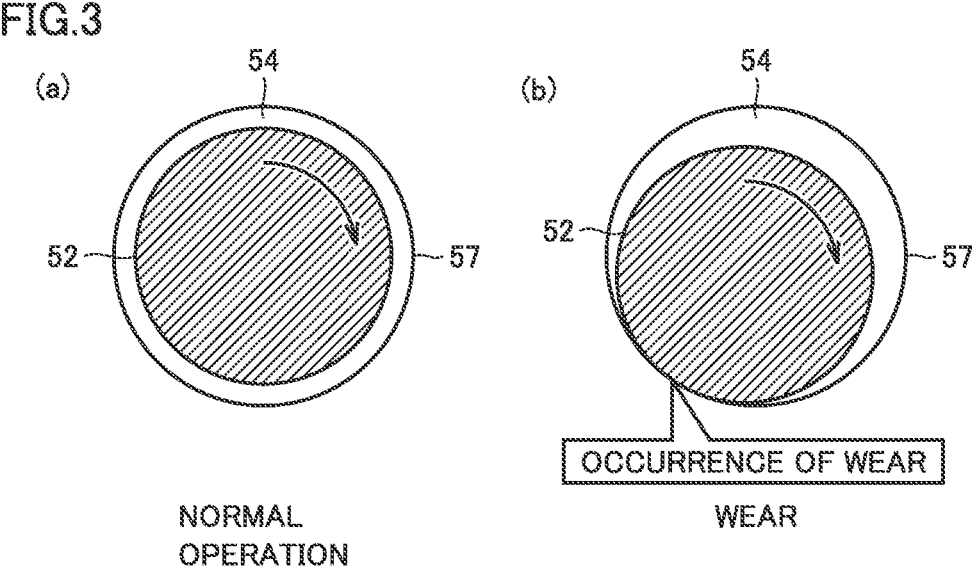
FIG. 3 is a cross-sectional view of a main spindle and a main bearing of the compressor.

A state of main spindle 52 and main bearing 57 while compressor 50 is driven will further be described. FIG. 3 is a cross-sectional view of main spindle 52 and main bearing 57 of compressor 50. FIG. 3 (a) shows a cross-sectional view when main spindle 52 and main bearing 57 are in a lubricated state and normally driven and FIG. 3 (b) shows a cross-sectional view when main spindle 52 and main bearing 57 are not in the lubricated state and abnormally driven. In normal drive as in FIG. 3 (a), a portion between main spindle 52 and main bearing 57 is filled with sufficient lubricating oil 54 and main spindle 52 smoothly rotates with respect to main bearing 57 with a certain gap being secured therebetween. In abnormal drive as in FIG. 3 (b), on the other hand, under the influence by the temperature or deterioration over time, viscosity of lubricating oil 54 becomes lower and an oil film between main spindle 52 and main bearing 57 cannot be secured. Therefore, main spindle 52 and main bearing 57 partially come in contact with each other, and wear of main bearing 57 occurs in this portion of contact. When main spindle 52 continues to further rotate with main bearing 57 having been worn, wear of main bearing 57 is aggravated, and ultimately, compressor 50 may be stopped (downtime) and availability of compressor 50 may become lower.

Figure 4:
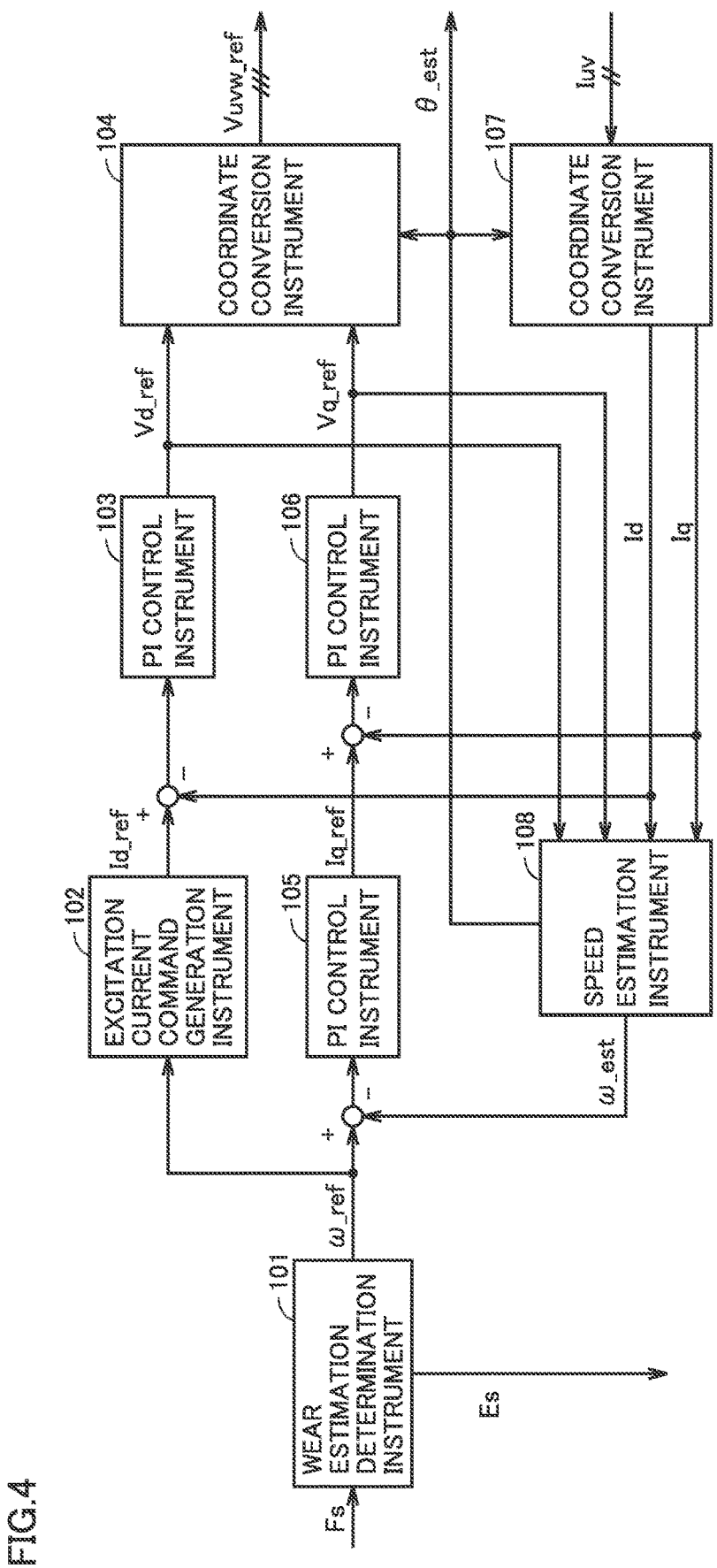
FIG. 4 is a control block diagram of a controller.

Control of compressor 50 and failure diagnosis apparatus 1000 by controller 100 will now be described. FIG. 4 is a control block diagram of controller 100. Controller 100 includes wear estimation determination instrument 101, an excitation current command generation instrument 102, a proportional integral (PI) control instrument 103, a coordinate conversion instrument 104, a PI control instrument 105, a PI control instrument 106, a coordinate conversion instrument 107, and a speed estimation instrument 108. Wear estimation determination instrument 101 receives failure diagnosis start signal Fs from wear diagnosis generator 400 and outputs estimation start signal Es to wear estimator 200 to generate speed command value ω_ref. Excitation current command generation instrument 102 generates an excitation current command value Id_ref in accordance with speed command value ω_ref. PI control instrument 103 calculates a d-axis voltage command value Vd_ref by proportion integral control based on a differential value between excitation current command value Id_ref and a d-axis current Id resulting from conversion by coordinate conversion instrument 107 and outputs d-axis voltage command value Vd_ref to coordinate conversion instrument 104.

Coordinate conversion instrument 104 calculates a voltage command value Vuvw_ref of three-phase AC by coordinate conversion processing based on phase estimation value θ_est estimated by speed estimation instrument 108 on d-axis voltage command value Vd_ref from PI control instrument 103 and a q-axis voltage command value Vq_ref from PI control instrument 106 and outputs voltage command value Vuvw_ref to inverter 4.

PI control instrument 105 calculates a q-axis current command value Iq_ref by proportion integral control based on a differential value between speed command value ω_ref and a speed estimation value ω_est estimated by speed estimation instrument 108 and outputs q-axis current command value Iq_ref to PI control instrument 106.

PI control instrument 106 calculates a q-axis voltage command value Vq_ref by proportion integral control based on a differential value between a q-axis current command value Iq_ref and a q-axis current Iq resulting from conversion by coordinate conversion instrument 107 and outputs q-axis voltage command value Vq_ref to coordinate conversion instrument 104.

Coordinate conversion instrument 107 calculates a current Iw from currents of two phases (for example, Iu and Iv) of three-phase AC based on an expression 1. Then, coordinate conversion instrument 107 performs coordinate conversion processing on currents Iuvw of three-phase AC with the use of phase estimation value θ_est calculated by speed estimation instrument 108 and outputs d-axis current Id and q-axis current Iq.

$$Iw = -Iu - Iv \quad \text{(Expression 1)}$$

Speed estimation instrument 108 estimates speed estimation value ω_est and phase estimation value θ_est based on d-axis voltage command value Vd_ref and q-axis voltage command value Vq_ref as well as d-axis current Id and q-axis current Iq. Then, estimated speed estimation value ω_est is outputted to PI control instrument 105, and estimated phase estimation value θ_est is outputted to coordinate conversion instrument 104, coordinate conversion instrument 107, and wear estimator 200. Speed estimation instrument 108 estimates speed estimation value ω_est and phase estimation value θ_est, for example, by applying adaptive flux observer which is a known technique. Though detailed description of the adaptive flux observer is not provided, the adaptive flux observer is robust against variation in number of flux linkages, and it is excellent in being free from an error in steady speed estimation. Therefore, the adaptive flux observer has widely been recognized as a highly sophisticated speed estimation method. Speed estimation instrument 108 is not limited to such a configuration to estimate a speed with the adaptive flux observer.

Controller 100 can estimate a speed of motor 53 to drive compressor 50 as shown in FIG. 4 and can control the speed of motor 53 to follow speed command value ω_ref generated by wear estimation determination instrument 101.

Figure 5:
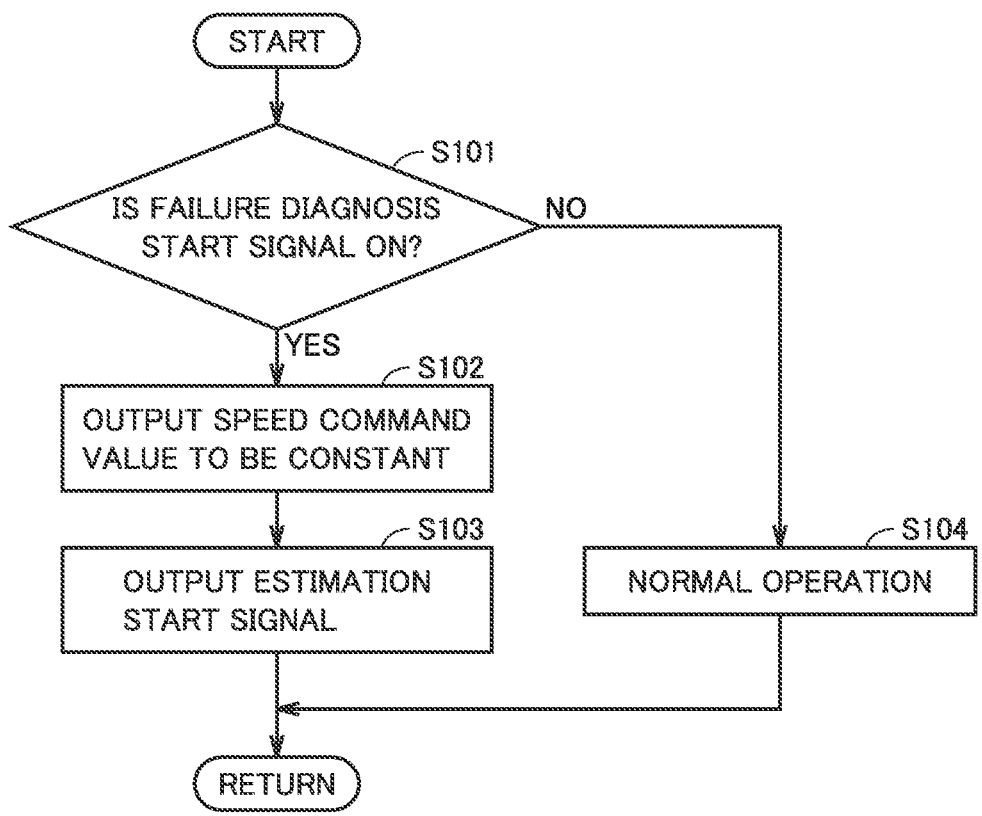
FIG. 5 is a flowchart for showing and illustrating exemplary processing in the controller.

Control as to whether or not controller 100 diagnoses a failure of motor 53 will be described in further detail. FIG. 5 is a flowchart for showing and illustrating exemplary processing in controller 100. FIG. 5 illustrates a control flow in wear estimation determination instrument 101. Wear estimation determination instrument 101 determines whether or not failure diagnosis start signal Fs from wear diagnosis generator 400 is an "ON" signal (step S101). When failure diagnosis start signal Fs is the "ON" signal (YES in step S101), wear estimation determination instrument 101 determines to start failure diagnosis, and generates a command value such that speed command value ω_ref is constant and outputs speed command value ω_ref to excitation current command generation instrument 102 and PI control instrument 105 (step S102).

After wear estimation determination instrument 101 generates speed command value ω_ref, it outputs estimation start signal Es of the "ON" signal to wear estimator 200 (step S103). Wear estimator 200 performs processing for estimating the amount of wear of main bearing 57 upon receiving estimation start signal Es.

When failure diagnosis start signal Fs is an "OFF" signal (NO in step S101), wear estimation determination instrument 101 determines to have compressor 50 normally operate (step S104). In normal operations, wear estimation determination instrument 101 generates speed command value ω_ref in accordance with a load state of compressor 50 and outputs speed command value ω_ref to excitation current command generation instrument 102 and PI control instrument 105. For example, when the load state of compressor 50 is high, wear estimation determination instrument 101 generates large speed command value ω_ref, and when the load state of compressor 50 is low, it generates small speed command value ω_ref. Wear estimation determination instrument 101 thus has motor 53 driven to accelerate or decelerate depending on the load state. In other words, as shown in FIG. 5, when failure diagnosis start signal Fs is the "ON" signal, wear estimation determination instrument 101 generates speed command value ω_ref to drive motor 53 in a constant state in order to start failure diagnosis, and when failure diagnosis start signal Fs is the "OFF" signal, it generates speed command value ω_ref in accordance with the load state of compressor 50 for normal operations.

Figure 6:
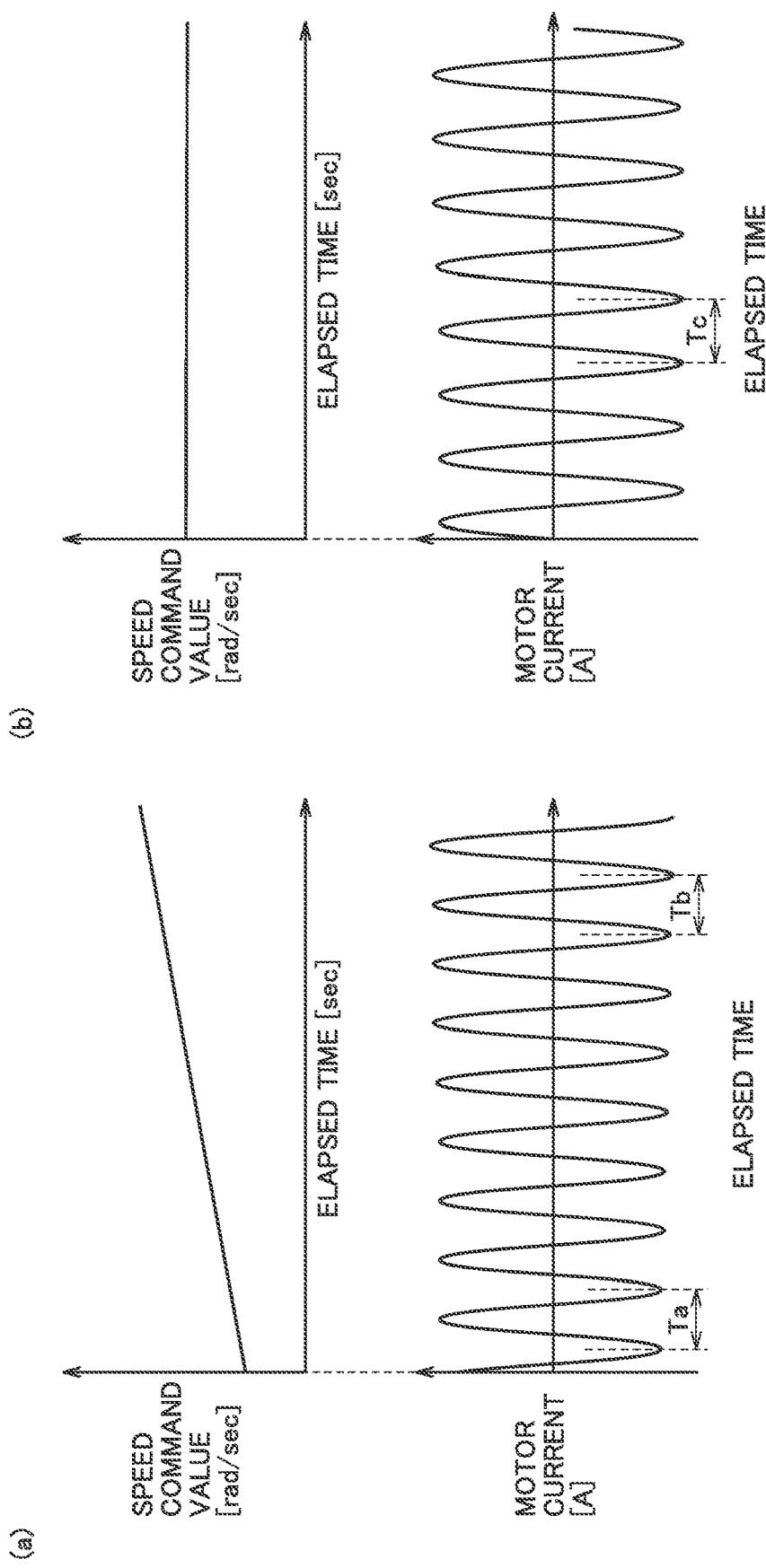
FIG. 6 is a diagram illustrating relation between an operating state of a motor and a current in the motor.

FIG. 6 is a diagram illustrating relation between an operating state of motor 53 and a current in motor 53. FIG. 6 (a) shows variation in speed command value and current value while motor 53 is driven to accelerate. In a graph in an upper tier in FIG. 6 (a), the abscissa represents elapsed time (sec) and the ordinate represents a speed command value (rad/sec). In a graph in a lower tier in FIG. 6 (a), the abscissa represents elapsed time (different in scale from the elapsed time in the graph in the upper tier) and the ordinate represents a U-phase current value of motor 53.

FIG. 6 (b) shows variation in speed command value and current value while motor 53 is driven in a constant state. In a graph in an upper tier in FIG. 6 (b), the abscissa represents elapsed time (sec) and the ordinate represents a speed command value (rad/sec). In a graph in a lower tier in FIG. 6 (b), the abscissa represents elapsed time (different in scale from the elapsed time in the graph in the upper tier) and the ordinate represents a U-phase current value of motor 53.

A period Ta, a period Tb, and a period Tc shown in FIG. 6 each represent one cycle of a current in motor 53 at a certain time point. As described already, while motor 53 mounted on compressor 50 is driven to accelerate, speed command value ω_ref increases with lapse of time, and an amplitude of the current in motor 53 also gradually increases. With increase in speed command value ω_ref, a length of one cycle of the current in motor 53 gradually becomes shorter (Ta>Tb). While motor 53 is driven to decelerate, with lapse of time, speed command value ω_ref decreases and the amplitude of the current in motor 53 also gradually decreases. With decrease in speed command value ω_ref, the length of one cycle of the current in motor 53 gradually increases (Ta<Tb).

When there is no abrupt variation in load state of compressor 50, speed command value ω_ref becomes constant and the amplitude of the current in motor 53 also becomes constant. When speed command value ω_ref is constant, the length of one cycle of the current in motor 53 is also constant (Tc). Therefore, while motor 53 of compressor 50 is driven in a constant state, variation in current in motor 53 is less than variation while motor 53 is driven to accelerate or decelerate, which is suitable for a condition for estimation of the amount of wear of main bearing 57. For example, a state in which motor 53 is driven at a rotation speed within ±1% of a target rotation speed is desirable as drive in a constant state. A rotation speed within this range could enhance accuracy in estimation of wear information. A state in which the rotation speed is substantially the same and not varying is desirable because accuracy in estimation of the wear information is further enhanced.

Figure 7:
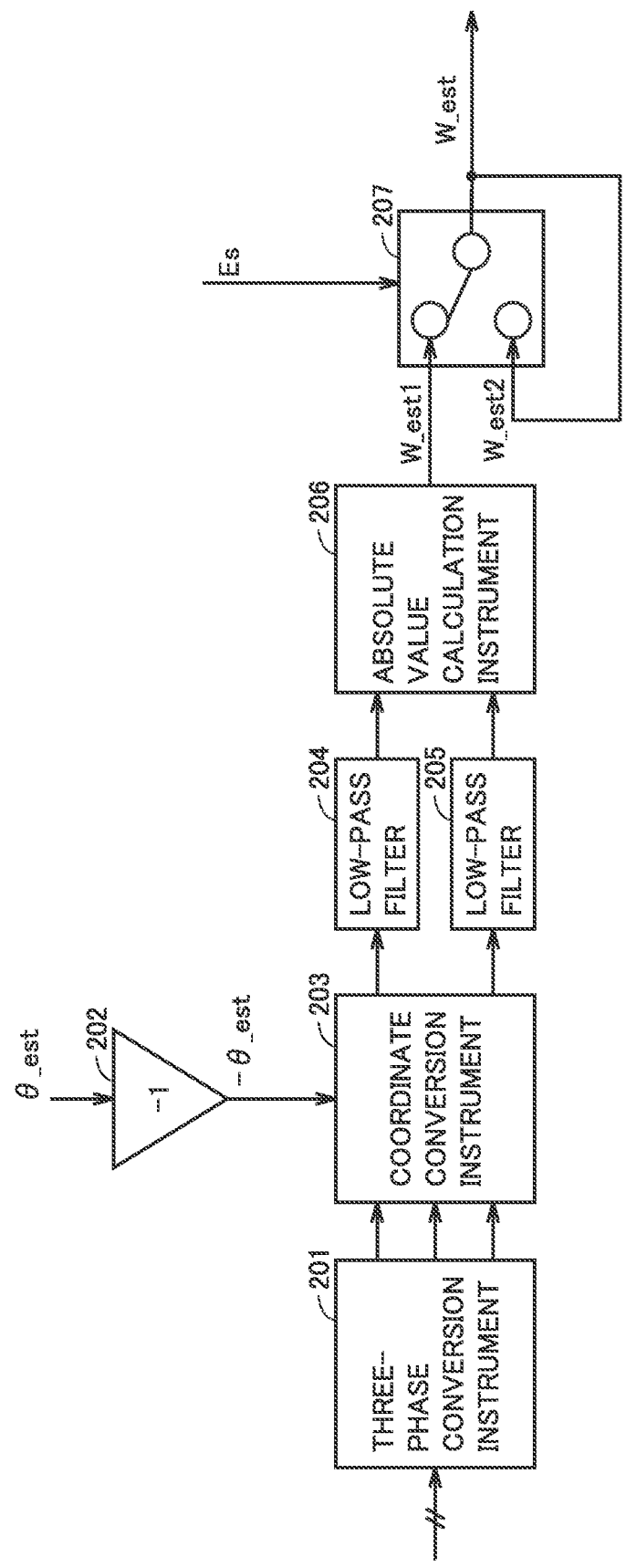
FIG. 7 is a control block diagram showing an exemplary wear estimator.

Processing for estimation of the amount of wear of main bearing 57 by wear estimator 200 will now be described in detail. FIG. 7 is a control block diagram showing an exemplary wear estimator 200. As shown in FIG. 7, wear estimator 200 includes a three-phase conversion instrument 201, a phase conversion instrument 202, a coordinate conversion instrument 203, low-pass filters 204 and 205, an absolute value calculation instrument 206, and a switch 207.

Three-phase conversion instrument 201 calculates W-phase current Iw from currents (Iu and Iv) of two phases based on the expression 1 and outputs currents Iuvw of three-phase AC to coordinate conversion instrument 203. Phase conversion instrument 202 inverts phase estimation value θ_est from speed estimation instrument 108 to calculate an inverted phase estimation value −θ_est. Coordinate conversion instrument 203 performs coordinate conversion processing on currents Iuvw of three-phase AC with phase estimation value −θ_est resulting from inversion by phase conversion instrument 202 to convert currents Iuvw of three-phase AC into a DC component of two orthogonal axes.

Low-pass filters 204 and 205 remove an AC component from DC components of the two axes resulting from conversion by coordinate conversion instrument 203 to extract only necessary DC components. Absolute value calculation instrument 206 obtains an absolute value of the DC components of the two axes, that is, a square root value of a square sum to obtain an inverse-phase current value. Furthermore, absolute value calculation instrument 206 calculates a wear estimation amount W_est1 in accordance with the inverse-phase current value and outputs wear estimation amount W_est1 to switch 207. Coordinate conversion instrument 203 and low-pass filters 204 and 205 are band pass filters specialized in a current component that rotates in a reverse direction, and they are effective for extraction of a DC component and function as simple and high-performance filters.

Switch 207 switches whether or not to output wear estimation amount W_est1 in response to estimation start signal Es. Specifically, when estimation start signal Es is the "ON" signal, switch 207 outputs wear estimation amount W_est1 outputted from absolute value calculation instrument 206, and when estimation start signal Es is the "OFF" signal, it outputs previous wear estimation amount W_est as a wear estimation amount W_est2.

Figure 8:
FIG. 8 is a diagram illustrating an exemplary form of representation of timing of replacement of the compressor.

FIG. 8 is a diagram illustrating an exemplary form of representation of timing of replacement of compressor 50. Failure notification unit 300 notifies a user of a period until failure in accordance with a value of wear estimation amount W_est based on criteria shown in FIG. 8 (a). Under the criteria shown in FIG. 8 (a), when wear estimation amount W_est is large, a period shown by failure notification unit 300 is short. For example, when the wear estimation amount is 0 "μm", failure notification unit 300 sets "twelve months" as the shown period. When the wear estimation amount is less than 20 "μm", failure notification unit 300 sets "ten months" as the shown period. When the wear estimation amount is less than 40 "μm", failure notification unit 300 sets "eight months" as the shown period. When the wear estimation amount is less than 60 "μm", failure notification unit 300 sets "six months" as the shown period. When the wear estimation amount is less than 80 "μm", failure notification unit 300 sets "four months" as the shown period. When the wear estimation amount is less than 100 "μm", failure notification unit 300 sets "two months" as the shown period. Furthermore, depending on the shown period set in FIG. 8 (a), for example, failure notification unit 300 has "replace compressor within ••••" shown on a display (not shown) as shown in FIG. 8 (b) to encourage the user to replace compressor 50. •••• means the shown period. An object which failure notification unit 300 encourages the user to replace is not limited to compressor 50, and it may be motor 53 or main bearing 57 of motor 53.

FIG. 9 is a diagram illustrating exemplary timing of issuance of diagnosis timing. Wear diagnosis generator 400 diagnoses a failure at diagnosis timing in accordance with a value of wear estimation amount W_est based on criteria shown in FIG. 9. Wear diagnosis generator 400 issues failure diagnosis start signal Fs to controller 100 every diagnosis period shown in FIG. 9. Setting by wear diagnosis generator 400 is such that the diagnosis period is shorter as wear estimation amount W_est is larger. For example, when the wear estimation amount is 0 "µm", wear diagnosis generator 400 issues failure diagnosis start signal Fs such that the diagnosis timing comes at intervals of "thirty days." When the wear estimation amount is less than 20 "µm", wear diagnosis generator 400 issues failure diagnosis start signal Fs such that the diagnosis timing comes at intervals of "seven days." When the wear estimation amount is less than 40 "µm", wear diagnosis generator 400 issues failure diagnosis start signal Fs such that the diagnosis timing comes at intervals of "three days." When the wear estimation amount is less than 60 "µm", wear diagnosis generator 400 issues failure diagnosis start signal Fs such that the diagnosis timing comes at intervals of "one day." When the wear estimation amount is less than 80 "µm", wear diagnosis generator 400 issues failure diagnosis start signal Fs such that the diagnosis timing comes at intervals of "twelve hours." When the wear estimation amount is less than 100 "µm", wear diagnosis generator 400 issues failure diagnosis start signal Fs such that the diagnosis timing comes at intervals of "one hour." Issuance of failure diagnosis start signal Fs by wear diagnosis generator 400 means output of failure diagnosis start signal Fs of the "ON" signal, and wear diagnosis generator 400 otherwise outputs failure diagnosis start signal Fs of the "OFF" signal. Wear diagnosis generator 400 sets diagnosis timing to come within a period shorter than a period shown by failure notification unit 300 to encourage the user to replace compressor 50. In other words, wear diagnosis generator 400 generates a signal indicating start of failure diagnosis within a period shorter than a period which the user is notified of by failure notification unit 300 as information (for example, information encouraging the user to replace compressor 50) based on the wear information.

As set forth above, failure diagnosis apparatus 1000 according to the first embodiment diagnoses a failure of the motor to drive equipment. Failure diagnosis apparatus 1000 includes controller 100 to control drive of motor 53, wear estimator 200 to estimate the amount of wear of the bearing of motor 53 based on the current that flows in motor 53, and failure notification unit 300 to diagnose a failure of motor 53 based on the amount of wear of the bearing of motor 53 estimated by wear estimator 200 and to notify the user. When wear estimator 200 estimates the amount of wear of the bearing of motor 53, controller 100 controls drive of motor 53 such that motor 53 is driven in a constant state.

Since failure diagnosis apparatus 1000 thus estimates the amount of wear of the bearing while motor 53 is driven in a constant state, the amount of wear can more accurately be estimated than when motor 53 is driven to accelerate or decelerate, unexpected downtime can be suppressed, and appropriate maintenance works can be done.

Preferably, controller 200 controls motor 53 to be driven at a constant rotation speed (for example, generates a command value such that speed command value ω_ref is constant) such that motor 53 is driven in a constant state. Controller 100 can thus control motor 53 to be driven at a constant rotation speed and can have wear estimator 200 estimate the amount of wear of the bearing while motor 53 is driven in a constant state.

Preferably, wear diagnosis generator 400 to generate a signal indicating start of failure diagnosis for controller 100 based on the amount of wear estimated by wear estimator 200 is further provided. Controller 100 can thus control start of failure diagnosis based on a signal indicating start of failure diagnosis (failure diagnosis start signal Fs). Preferably, wear diagnosis generator 400 generates the signal indicating start of failure diagnosis within a period shorter than a period which the user is notified of by failure notification unit 300 as information based on the wear information.

Preferably, failure notification unit 300 notifies the user of timing of replacement of the bearing of motor 53 based on the amount of wear of the bearing of motor 53 estimated by wear estimator 200. Failure notification unit 300 can thus appropriately encourage the user to replace the bearing of motor 53 or motor 53 and can have the user recognize in advance timing to do maintenance. Therefore, appropriate maintenance works can be done.

Failure diagnosis system SYS1 according to the first embodiment includes motor 53 to drive equipment, inverter 4 to supply electric power to motor 53, controller 100 to output a voltage command to inverter 4 to control drive of motor 53, wear estimator 200 to estimate the amount of wear of the bearing of motor 53 based on the current that flows in motor 53, and failure notification unit 300 to diagnose a failure of motor 53 based on the amount of wear of the bearing of motor 53 estimated by wear estimator 200 and to notify the user. When wear estimator 200 estimates the amount of wear of the bearing of motor 53, controller 100 controls drive of motor 53 such that motor 53 is driven in a constant state.

Since failure diagnosis system SYS1 thus estimates the amount of wear of the bearing while motor 53 is driven in a constant state, it can estimate the amount of wear more accurately than when motor 53 is driven to accelerate or decelerate, unexpected downtime can be suppressed, and appropriate maintenance works can be done.

Second Embodiment

Figure 10:
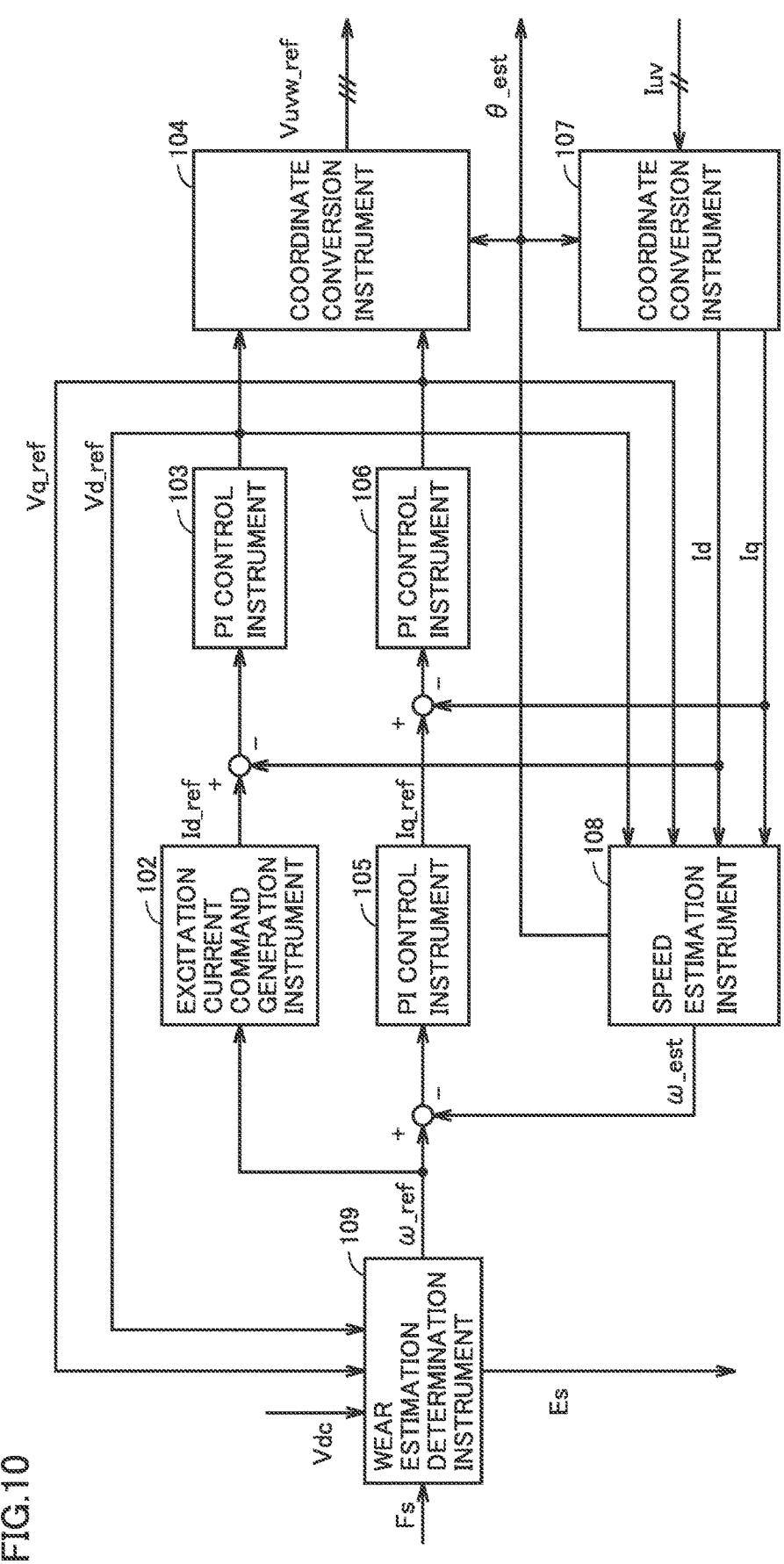
FIG. 10 is a control block diagram of the controller according to a second embodiment.

In connection with failure diagnosis apparatus 1000 in the first embodiment, a configuration where motor 53 is controlled to be driven in a constant state and the amount of wear of the bearing of motor 53 is estimated while motor 53 is driven in a constant state is described. In a second embodiment, a configuration in which motor 53 is controlled to be driven in a constant state in consideration of a speed of motor 53 will be described. FIG. 10 is a control block diagram of controller 100 according to the second embodiment. The second embodiment is different from the first embodiment in information inputted to and outputted from a wear estimation determination instrument 109. Since the failure diagnosis system according to the second embodiment is otherwise the same in configuration as that in the first embodiment, the same elements have the same reference numerals allotted and detailed description will not be repeated.

As shown in FIG. 10, wear estimation determination instrument 109 receives input of failure diagnosis start signal Fs, bus voltage Vdc from voltage sensor 5, d-axis voltage command value Vd_ref from PI control instrument 103, and q-axis voltage command value Vq_ref from PI control instrument 106. In other words, wear estimation determination instrument 109 generates estimation start signal Es and speed command value ω_ref in consideration of bus voltage Vdc, d-axis voltage command value Vd_ref, and q-axis voltage command value Vq_ref.

Figure 11:
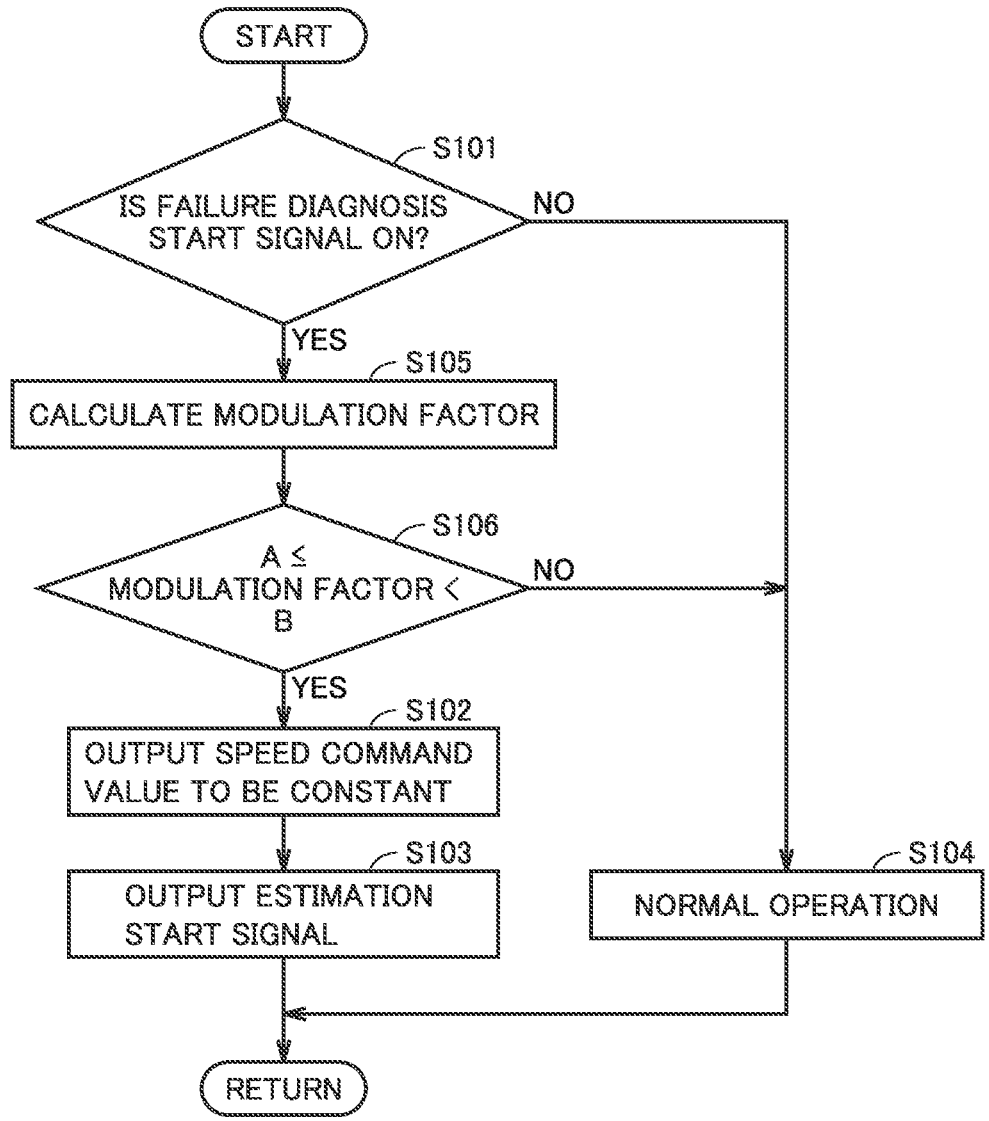
FIG. 11 is a flowchart for showing and illustrating exemplary processing in the controller according to the second embodiment.

FIG. 11 is a flowchart for showing and illustrating exemplary processing in controller 100 according to the second embodiment. FIG. 11 illustrates a control flow in wear estimation determination instrument 109. Wear estimation determination instrument 109 determines whether or not failure diagnosis start signal Fs from wear diagnosis generator 400 is the "ON" signal (step S101). When failure diagnosis start signal Fs is the "ON" signal (YES in step S101), wear estimation determination instrument 109 calculates a modulation factor based on bus voltage Vdc, d-axis voltage command value Vd_ref, and q-axis voltage command value Vq_ref (step S105). Specifically, wear estimation determination instrument 109 calculates a modulation factor Duty in accordance with an (expression 2) below.

[Expression 2]

$$\text{Duty} = \frac{\sqrt{2} \times \sqrt{V_{d\_ref}^2 + V_{q\_ref}^2}}{V_{dc}} \quad \text{(Expression 2)}$$

Then, wear estimation determination instrument 109 determines whether or not calculated modulation factor Duty is equal to or larger than a value A set in advance and smaller than a value B set in advance (step S106). When calculated modulation factor Duty is equal to or larger than value A set in advance and smaller than value B set in advance (YES in step S106), wear estimation determination instrument 109 determines to start failure diagnosis, and generates a command value such that speed command value ω_ref is constant and outputs speed command value ω_ref to excitation current command generation instrument 102 and PI control instrument 105 (step S102).

After wear estimation determination instrument 109 generates speed command value ω_ref, it outputs estimation start signal Es of the "ON" signal to wear estimator 200 (step S103). Wear estimator 200 performs processing for estimating the amount of wear of main bearing 57 upon receiving estimation start signal Es.

When failure diagnosis start signal Fs is the "OFF" signal (NO in step S101) or when calculated modulation factor Duty is smaller than value A set in advance or equal to or larger than value B set in advance (NO in step S106), wear estimation determination instrument 109 determines to have compressor 50 normally operate (step S104).

Value A set in advance should only be a value smaller than one at which voltage saturation occurs, and it is set, for example, to 0.9 in consideration of occurrence of load variation in compressor 50. Value B set in advance is a value equal to or larger than one, at which voltage saturation does not occur.

Figure 12:
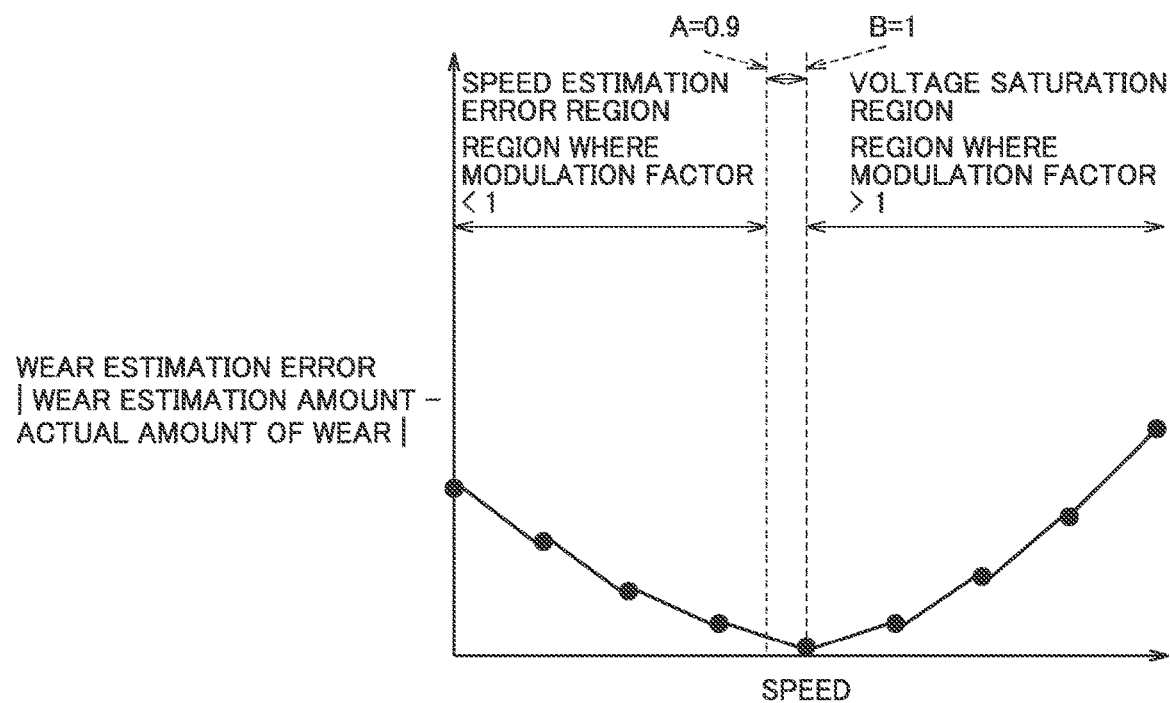
FIG. 12 is a diagram illustrating an estimation error of an amount of wear with respect to a speed of the motor.

Relation of a wear estimation error with respect to a speed of motor 53 will now be described. FIG. 12 is a diagram illustrating an estimation error of an amount of wear with respect to a speed of motor 53. The abscissa shown in FIG. 12 represents a speed (the number of rotations) of motor 53 and the ordinate represents a wear estimation error of main bearing 57. The wear estimation error refers to a difference in absolute value between wear estimation amount W_est and an actual amount of wear. The actual amount of wear refers to an amount of wear at the time when wear is reproduced by grinding of a bearing to a determined value in advance.

As can be seen in FIG. 12, a period during which the wear estimation error is large at a speed of motor 53 is not suitable as a period for estimation of the amount of wear, and in contrast, a period during which the wear estimation error is small is suitable for estimation of the amount of wear. When the speed of motor 53 is low (a region of the modulation factor <1), influence by the speed estimation error is likely in speed estimation instrument 108 and an error is caused in phase estimation value θ_est. Therefore, the wear estimation error is large and the period during which the modulation factor is smaller than value A set in advance is not suitable for estimation of the amount of wear.

When the speed of motor 53 is high (a region of the modulation factor >1), a voltage is saturated, inverter 4 is overmodulated, and coordinate conversion instrument 104 is unable to output intended voltage command value Vunw_ref. Therefore, the wear estimation error is large and the period during which the modulation factor is equal to or larger than value B set in advance is not suitable for estimation of the amount of wear. Therefore, wear estimation determination instrument 109 generates a command value such that speed command value ω_ref is constant within a range of the modulation factor equal to or larger than value A set in advance and smaller than value B set in advance, so that the wear estimation error in wear estimator 200 becomes smaller and the period during which the wear estimation error is small can be determined as being suitable for estimation of the amount of wear.

Processing from step S101 to step S104 in the flowchart shown in FIG. 11 is equivalent to contents described in the first embodiment.

As set forth above, failure diagnosis apparatus 1000 according to the second embodiment determines whether or not controller 100 should control motor 53 to be driven in a constant state based on the calculated modulation factor. Failure diagnosis apparatus 1000 can thus determine the speed command value for motor 53 in accordance with the modulation factor and can estimate the amount of wear. Therefore, failure diagnosis apparatus 1000 can accurately estimate the amount of wear in consideration also of influence by load variation in compressor 50. Furthermore, in the second embodiment, unexpected downtime can be suppressed and appropriate maintenance works can be done.

Preferably, when the calculated modulation factor is equal to or larger than 0.9 and smaller than 1.0, controller 100 controls the motor to be driven in a constant state. Controller 100 can thus determine the speed command value with the modulation factor being in the vicinity of one to estimate the amount of wear, and hence aggravation of accuracy in estimation of the amount of wear due to the phase estimation error in a low speed region and aggravation of accuracy in estimation of the amount of wear due to voltage saturation in a high speed region can be suppressed.

Third Embodiment

In connection with failure diagnosis apparatus 1000 according to a third embodiment, a configuration in which wear information (amount of wear) of the bearing of motor 53 is estimated with what is called artificial intelligence (AI) will be described. In the third embodiment, prior to description of estimation of wear information of main bearing 57 of motor 53, initially, training processing will be described. This training processing is processing for generating an estimation model used for estimation of wear information of the bearing of the motor. In a fourth embodiment, processing for estimating wear information of the bearing of the motor with the use of an estimation model generated in the third embodiment will be described.

Figure 13:
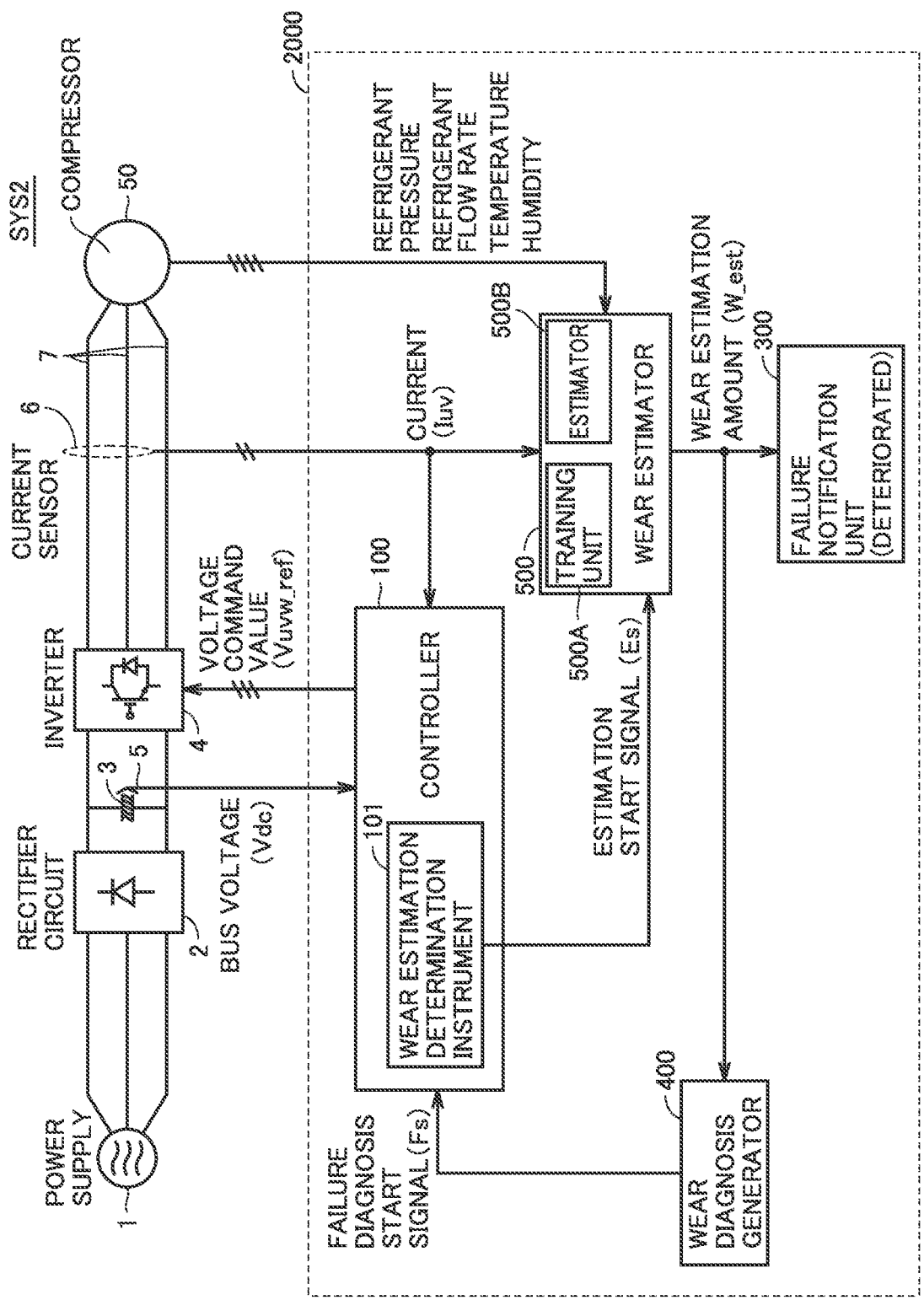
FIG. 13 is a block diagram for illustrating an exemplary configuration of a failure diagnosis system in a third embodiment.

FIG. 13 is a block diagram for illustrating an exemplary configuration of a failure diagnosis system SYS2 in the third embodiment. Failure diagnosis system SYS2 in the third embodiment is the same in configuration as failure diagnosis system SYS1 in the first embodiment except for difference of a wear estimator 500 from wear estimator 200, and the same elements have the same reference numerals allotted and detailed description will not be repeated.

Wear estimator 500 is different from wear estimator 200 in information inputted thereto and outputted therefrom and internal processing. Wear estimator 500 obtains estimation start signal Es from controller 100, currents (for example, Iu and Iv) of two phases of three-phase AC detected by current sensor 6, and a quantity of state including a pressure of refrigerant in compressor 50, a temperature around compressor 50, a humidity around compressor 50, and a flow rate of refrigerant. The "pressure of refrigerant in compressor 50" is referred to as a "refrigerant pressure." The "temperature around compressor 50" is referred to as a "temperature". The "humidity around compressor 50" is referred to as a "humidity". The "flow rate of refrigerant" is referred to as a "refrigerant flow rate." The refrigerant pressure, the temperature, the humidity, and the refrigerant flow rate are quantities of state indicating an operating state of air-conditioning equipment. Then, wear estimator 500 outputs wear estimation amount W_est estimated by artificial intelligence based on currents of two phases of three-phase AC detected by current sensor 6 and the quantity of state indicating the operating state to failure notification unit 300 and wear diagnosis generator 400.

Figure 14:
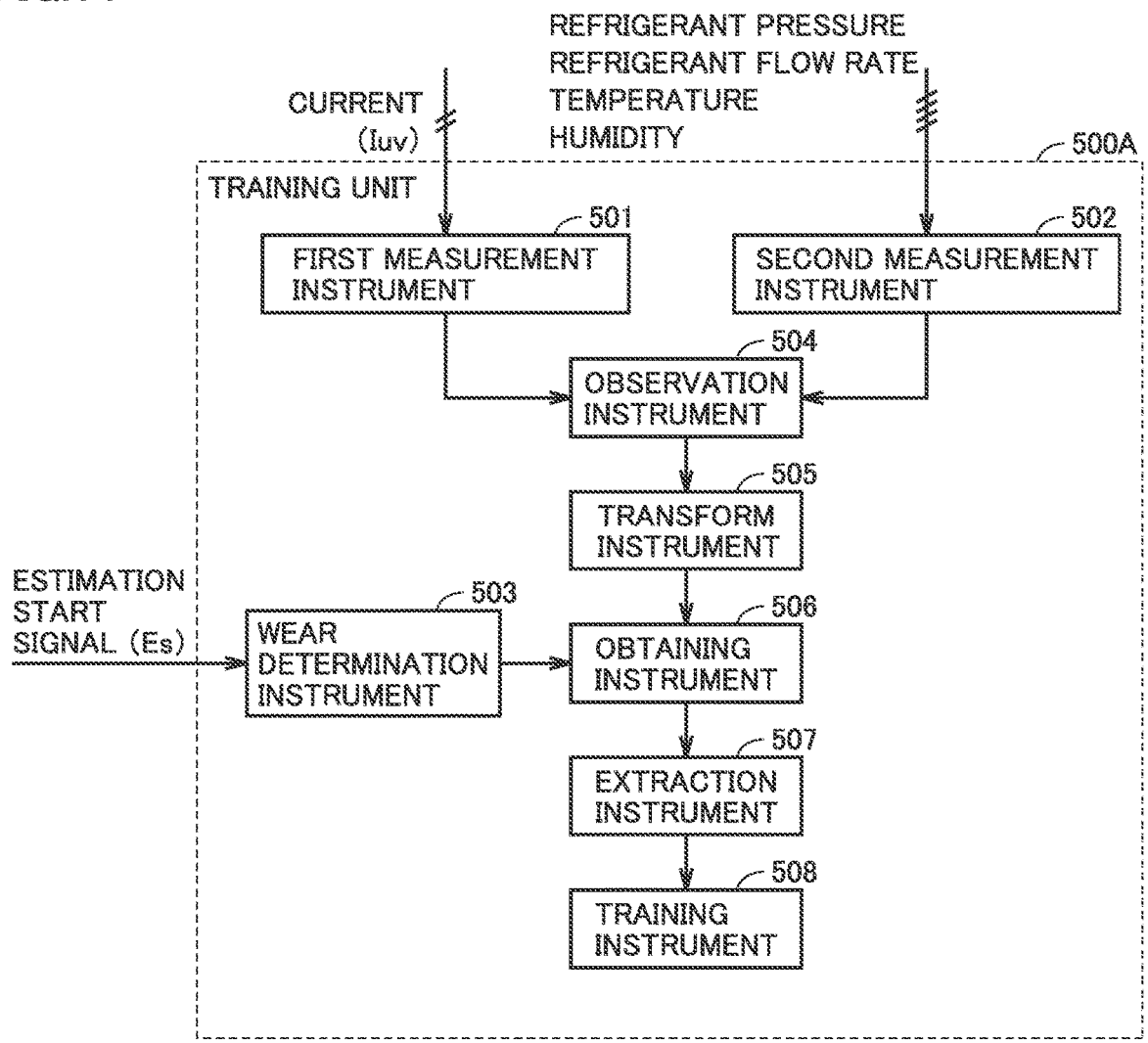
FIG. 14 is a diagram for illustrating an exemplary configuration of a training unit in the third embodiment.

Wear estimator 500 includes a training unit 500A and an estimator 500B. Training unit 500A will initially be described. FIG. 14 is a diagram for illustrating an exemplary configuration of training unit 500A in the third embodiment. Training unit 500A includes a first measurement instrument 501, a second measurement instrument 502, a wear determination instrument 503, an observation instrument 504, a transform instrument 505, an obtaining instrument 506, an extraction instrument 507, and a training instrument 508.

First measurement instrument 501 measures currents (Iuv) of two phases of three-phase AC detected by current sensor 6. First measurement instrument 501 outputs the detected currents to observation instrument 504 as time-series data. The currents detected by current sensor 6 are also referred to as a "first status variable."

Second measurement instrument 502 outputs the refrigerant pressure, the temperature, the humidity, and the refrigerant flow rate to observation instrument 504 as time-series data. The refrigerant pressure, the temperature, the humidity, and the refrigerant flow rate are also referred to as a "second status variable" or a "variable indicating the operating state of the air-conditioning equipment." The second status variable is not limited to a status variable including information on all of the refrigerant pressure, the temperature, the humidity, and the refrigerant flow rate, and it may include information on at least one of the refrigerant pressure, the temperature, the humidity, and the refrigerant flow rate, or may include additional information (for example, operating noise around compressor 50) in addition to the information on the refrigerant pressure, the temperature, the humidity, and the refrigerant flow rate. The first status variable and the second status variable are also collectively referred to as a "status variable." The "status variable" may be expressed as a "parameter" or a "feature value."

Observation instrument 504 observes the time-series data from first measurement instrument 501 and second measurement instrument 502 to thereby obtain each status variable from the time-series data. Each status variable obtained by observation instrument 504 is inputted to transform instrument 505. Transform instrument 505 transforms the obtained status variable into a frequency domain. Transform instrument 505 transforms each obtained status variable into the frequency domain, for example, by Fourier transform or fast Fourier transform. Transform instrument 505 may transform each obtained status variable into the frequency domain with another technique. A frequency characteristic of each status variable transformed into the frequency domain by transform instrument 505 is outputted to obtaining instrument 506.

Wear determination instrument 503 determines wear of main bearing 57 of motor 53, for example, with a predetermined method. Wear determination instrument 503 generates wear information independently of wear information estimated by estimator 500B which will be described in the fourth embodiment. The wear information includes at least information on the amount of wear of main bearing 57 of motor 53 and may include other information such as whether or not main bearing 57 of motor 53 has worn. Furthermore, wear determination instrument 503 determines whether or not to estimate wear information based on estimation start signal Es. Alternatively, wear determination instrument 503 may reproduce a state of wear of main bearing 57 of motor 53 in a simulated environment where estimator 500B which will be described in the fourth embodiment is simulated and estimate wear information in response to the state of wear. The wear information generated by wear determination instrument 503 is inputted to obtaining instrument 506.

Obtaining instrument 506 obtains a training data set including a plurality of pieces of training data obtained by labeling of the frequency characteristic of each status variable of motor 53 with wear information of the bearing. Obtaining instrument 506 brings, for example, the frequency characteristic of each status variable resulting from transform by transform instrument 505 in correspondence with wear information generated by wear determination instrument 503 to obtain them as the training data set. Extraction instrument 507 extracts the frequency characteristic from the training data set. Training instrument 508 inputs the frequency characteristic extracted from the training data set into an estimation model and optimizes a parameter of the estimation model such that a result of estimation outputted from the estimation model is closer to the wear information with which the training data set is labeled. The estimation model includes, for example, a neural network and a parameter used by the neural network.

Figure 15:
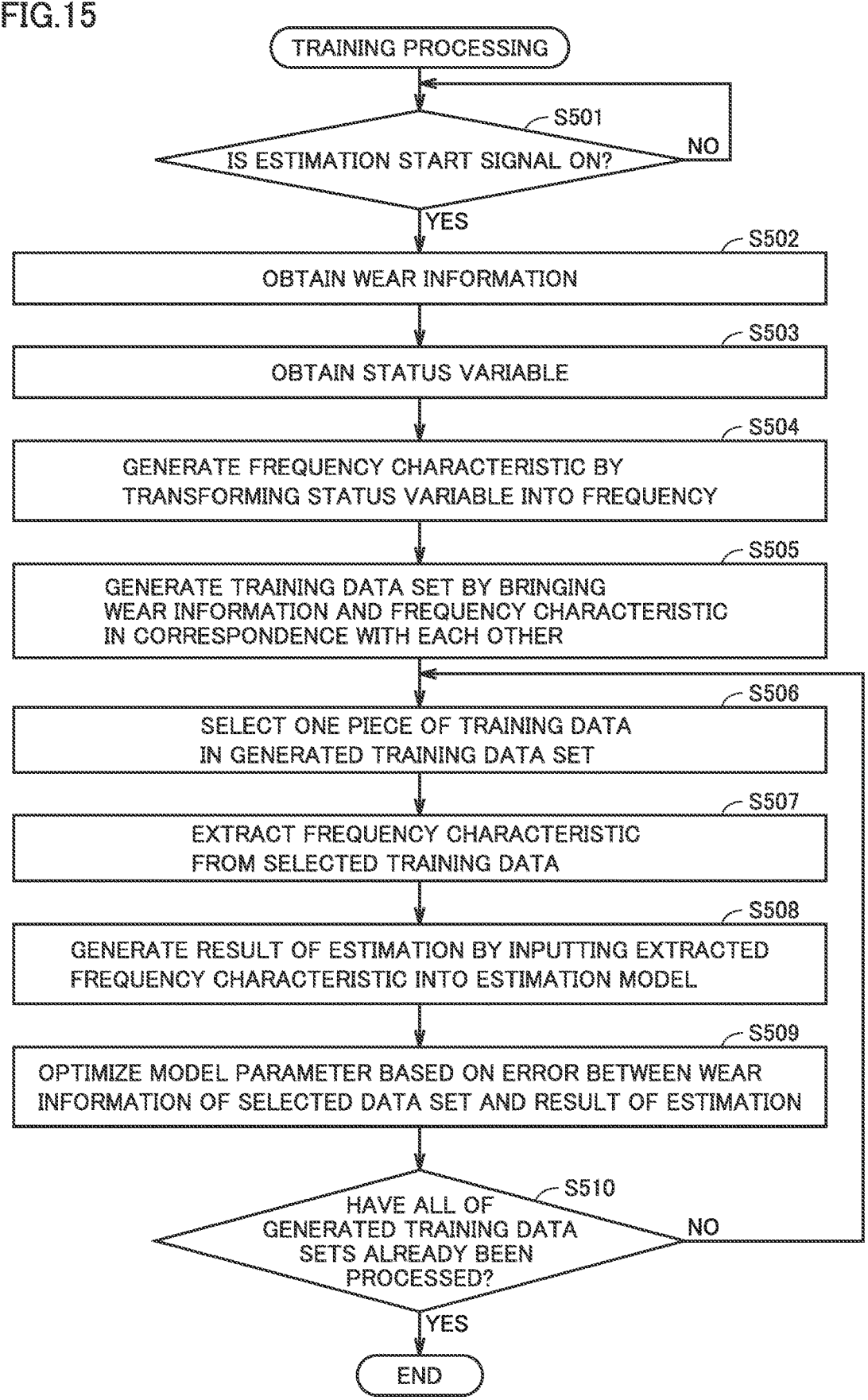
FIG. 15 is an exemplary flowchart of training processing in the training unit in the third embodiment.

Training processing in training unit 500A will now be described with reference to a flowchart. FIG. 15 is an exemplary flowchart of training processing in training unit 500A in the third embodiment. Training unit 500A determines, in wear determination instrument 503, whether or not to start estimation of wear information based on whether or not estimation start signal Es from wear estimation determination instrument 101 is the "ON" signal (step S501). When estimation start signal Es is the "OFF" signal (NO in step S501), training unit 500A has the process return to step S501. When estimation start signal Es is the "ON" signal (YES in step S501), training unit 500A has wear determination instrument 503 generate wear information, and training unit 500A obtains in obtaining instrument 506, the generated wear information (step S502).

Training unit 500A obtains in observation instrument 504, each status variable from the time-series data from first measurement instrument 501 and second measurement instrument 502 (step S503). Training unit 500A transforms in transform instrument 505, each obtained status variable into the frequency domain to thereby generate the frequency characteristic of each status variable (step S504). Training unit 500A brings the wear information obtained by obtaining instrument 506 in step S502 and the frequency characteristic generated in step S504 in correspondence with each other and generates them as the training data set (step S505).

Training unit 500A selects in extraction instrument 507, one of a plurality of pieces of training data included in the training data set (step S506). Training unit 500A extracts in extraction instrument 507, each frequency characteristic from the selected training data (step S507). Training unit 500A inputs each frequency characteristic extracted by extraction instrument 507 into the estimation model and generates a result of estimation (step S508). Training unit 500A optimizes in training instrument 508, the parameter of the estimation model based on an error between the wear information in training data selected in step S506 and the result of estimation generated in step S508 (step S509).

Then, training unit 500A determines in training instrument 508, whether or not all of generated training data sets have already been processed (step S510). When training unit 500A determines that all training data sets have not yet been processed (NO in step S510), it has the process return to step S506. When training unit 500A determines that all training data sets have already been processed (YES in step S510), it quits training processing. As the training processing ends, training unit 500A can appropriately generate the trained estimation model.

Training unit 500A performs training processing based on what is called supervised learning using wear information generated by wear determination instrument 503. Training processing in training unit 500A is not limited to training processing based on supervised learning, and it may perform training processing based on what is called unsupervised learning. Training processing based on unsupervised learning refers to learning processing where a large amount of input data (for example, each frequency characteristic) alone is given to training unit 500A for learning of how input data is distributed and input data is compressed, classified, and shaped without correct answer information (for example, wear information) being given to a corresponding training data set.

Training unit 500A forms a cluster of similar data sets from features of training data sets. Training unit 500A may set some criteria based on a result of clustering and allocate the criteria to outputs from the estimation model such that the training data set is optimized, and may update the parameter of the estimation model. Alternatively, training unit 500A may perform training processing based on "semi-supervised learning" as training processing intermediate between unsupervised learning and supervised learning. Training processing based on semi-supervised learning refers to training processing for learning with the use of training data with corresponding wear information for some of all frequency characteristics and learning without corresponding wear information for other frequency characteristics.

As set forth above, training unit 500A according to the third embodiment is a training apparatus to train an estimation model for estimating wear information of the bearing of motor 53 to drive equipment. The estimation model estimates wear information of the bearing of motor 53 from the first status variable representing a current that flows in motor 53 and at least one second status variable among variables each representing the operating state of air-conditioning equipment. Training unit 500A includes obtaining instrument 506 to obtain a training data set including a plurality of pieces of training data obtained by labeling the first status variable and the second status variable with wear information of the bearing of motor 53 obtained in advance and training instrument 508 to optimize the estimation model with the training data set obtained by obtaining instrument 506 such that the result of estimation is closer to the wear information of the bearing of motor 53 for labeling.

Training unit 500A can thus highly accurately estimate the wear information of the bearing of motor 53 while motor 53 is operating in a constant state, with the use of the estimation model optimized with the training data set such that the result of estimation is closer to the wear information of the bearing of motor 53 for labeling.

A training method of training in training unit 500A, an estimation model for estimating wear information of the bearing of motor 53 to drive equipment includes obtaining a training data set including a plurality of pieces of training data obtained by labeling a first status variable and a second status variable with the wear information of the bearing of motor 53 obtained in advance and optimizing the estimation model with the obtained training data set such that a result of estimation is closer to the wear information of the bearing of motor 53 for labeling.

Fourth Embodiment

In the fourth embodiment, estimation processing for estimating wear information of main bearing 57 of motor 53 with the use of the estimation model subjected to training processing in the third embodiment will be described. Estimator 500B estimates wear information of main bearing 57 with the use of the trained estimation model generated in the third embodiment. Alternatively, estimator 500B may obtain the trained estimation model from training unit 500A of another failure diagnosis apparatus 2000 over a network (not shown). Furthermore, estimator 500B may be integrated with training unit 500A to obtain the trained estimation model generated by training unit 500A.

Figure 16:
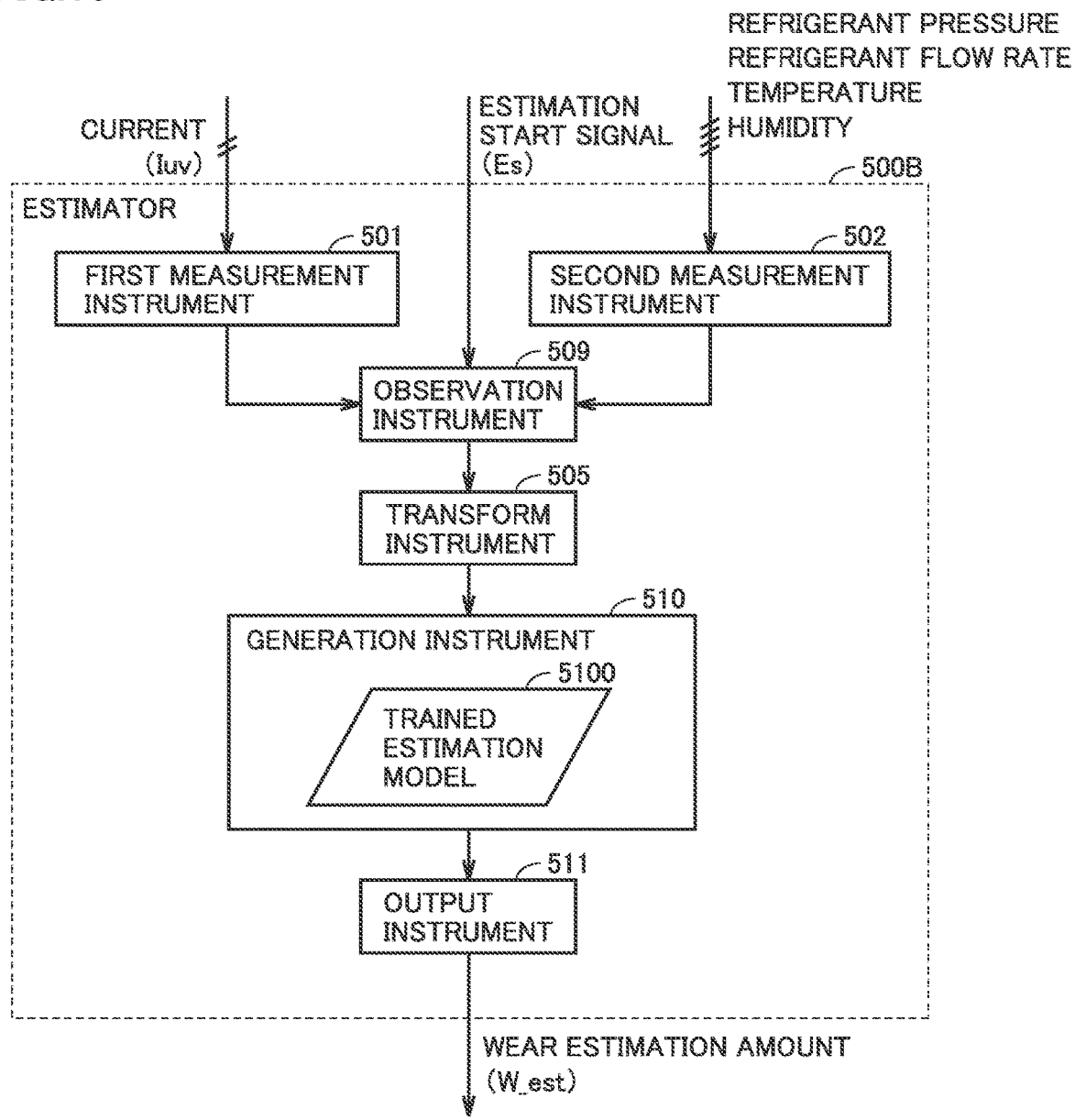
FIG. 16 is a diagram for illustrating an exemplary configuration of an estimator in a fourth embodiment.

FIG. 16 is a diagram for illustrating an exemplary configuration of estimator 500B in the fourth embodiment. Since a failure diagnosis system in the fourth embodiment is the same in configuration as failure diagnosis system SYS2 shown in FIG. 13 in the third embodiment, the same elements have the same reference numerals allotted and detailed description will not be repeated.

Estimator 500B estimates wear information of main bearing 57 of motor 53 shown in FIG. 2. Estimator 500B includes first measurement instrument 501, second measurement instrument 502, an observation instrument 509, transform instrument 505, a generation instrument 510, and an output instrument 511.

First measurement instrument 501 measures currents (Iuv) of two phases of three-phase AC detected by current sensor 6. First measurement instrument 501 outputs the detected currents to observation instrument 509 as time-series data. Second measurement instrument 502 outputs the refrigerant pressure, the temperature, the humidity, and the refrigerant flow rate to observation instrument 509 as the time-series data.

Observation instrument 509 observes the time-series data from first measurement instrument 501 and second measurement instrument 502 in response to estimation start signal Es to thereby obtain each status variable from the time-series data. The status variable is the status variable described in the third embodiment. Transform instrument 505 transforms each obtained status variable into the frequency domain.

Generation instrument 510 includes a trained estimation model 5100. Trained estimation model 5100 is an estimation model generated by training processing in training unit 500A. Generation instrument 510 generates wear information of main bearing 57 from the frequency characteristic obtained by transform by transform instrument 505 and trained estimation model 5100. Trained estimation model 5100 is an estimation model representing relation between the frequency characteristic of the status variable transformed into the frequency characteristic by transform instrument 505 and the wear information of main bearing 57. Output instrument 511 outputs the wear information of main bearing 57 generated by generation instrument 510 as wear estimation amount W_est. Output from output instrument 511 is provided to wear diagnosis generator 400 and failure notification unit 300.

Figure 17:
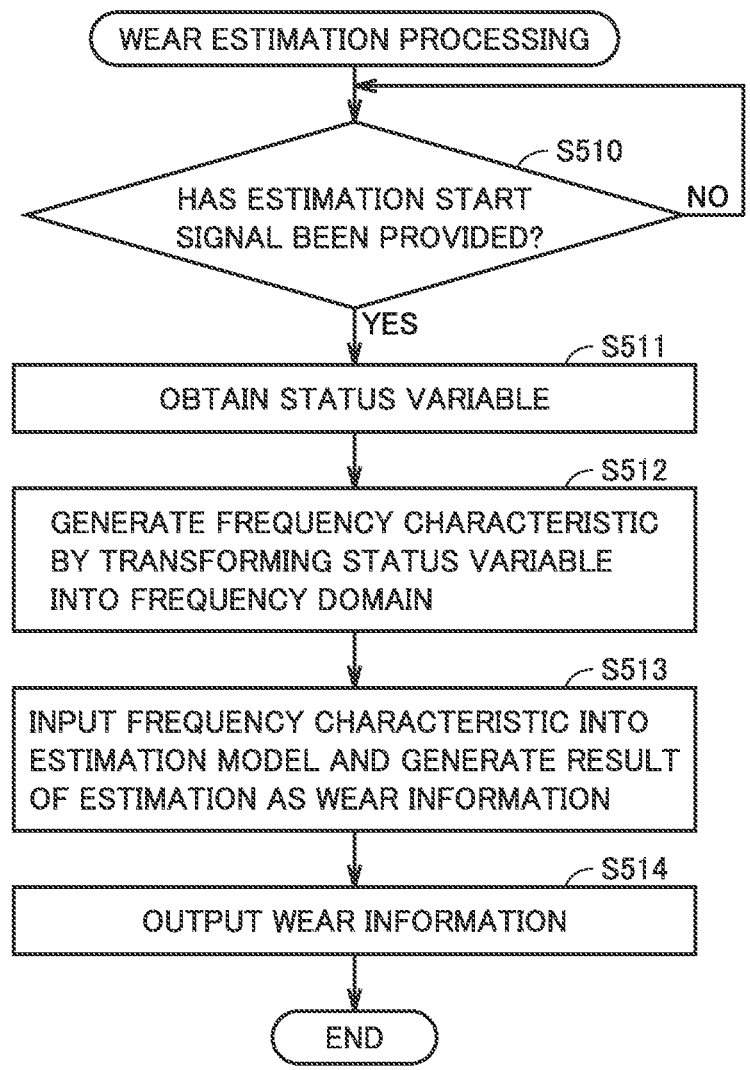
FIG. 17 is an exemplary flowchart of estimation processing in the estimator in the fourth embodiment.

Estimation processing in estimator 500B will now be described with reference to a flowchart. FIG. 17 is an exemplary flowchart of estimation processing in estimator 500B in the fourth embodiment. Estimator 500B makes determination as to start of estimation of wear information based on whether or not estimation start signal Es from wear estimation determination instrument 101 is the "ON" signal (step S510). When estimation start signal Es is the "OFF" signal (NO in step 510), estimator 500B has the process return to step S510. When estimation start signal Es is the "ON" signal (YES in step S510), estimator 500B obtains in observation instrument 509, each status variable from the time-series data from first measurement instrument 501 and second measurement instrument 502 (step S511).

Estimator 500B transforms in transform instrument 505, each obtained status variable into the frequency domain to generate the frequency characteristic of each status variable (step S512). Estimator 500B inputs the generated frequency characteristic into trained estimation model 5100, and estimator 500B generates in generation instrument 510, a result of estimation as wear information (step S513). Estimator 500B outputs from output instrument 511, the generated wear information as wear estimation amount W_est.

As set forth above, estimator 500B according to the fourth embodiment estimates wear information of the bearing of motor 53 from the first status variable representing the current that flows in motor 53 and at least one second status variable among variables each representing the operating state of air-conditioning equipment based on the estimation model generated in training processing using the training data set. The training data set includes a plurality of pieces of training data obtained by labeling the first status variable and the second status variable with the wear information of the bearing of motor 53 obtained in advance.

Estimator 500B can thus highly accurately estimate wear information of the bearing of motor 53 while motor 53 is operating in a constant state, with the use of the estimation model trained with the training data set such that the result of estimation is closer to the wear information of the bearing of motor 53 for labeling. Estimator 500B can highly accurately infer wear information by using, other than the current in motor 53, the second status variable of the compressor for machine learning even when factors leading to wear are complicated and it is difficult to set in advance a function for estimating wear information.

Preferably, estimator 500B includes transform instrument 505 to transform the first status variable and the second status variable into a predetermined frequency domain to output the frequency domain as the frequency characteristic of the first status variable and the second status variable. Estimator 500B thus readily inputs the first status variable and the second status variable into the estimation model to perform predetermined calculation.

Equipment is compressor 50, motor 53 to drive compressor 50 is connected to inverter 4, and inverter 4 outputs AC power through a bus to motor 53. The first status variable is a current that flows from inverter 4 to motor 53. The second status variable preferably includes at least one of a pressure of refrigerant that flows in compressor 50, a flow rate of refrigerant, a temperature around compressor 50, operating noise around compressor 50, and a humidity around compressor 50.

Fifth Embodiment

Figure 18:
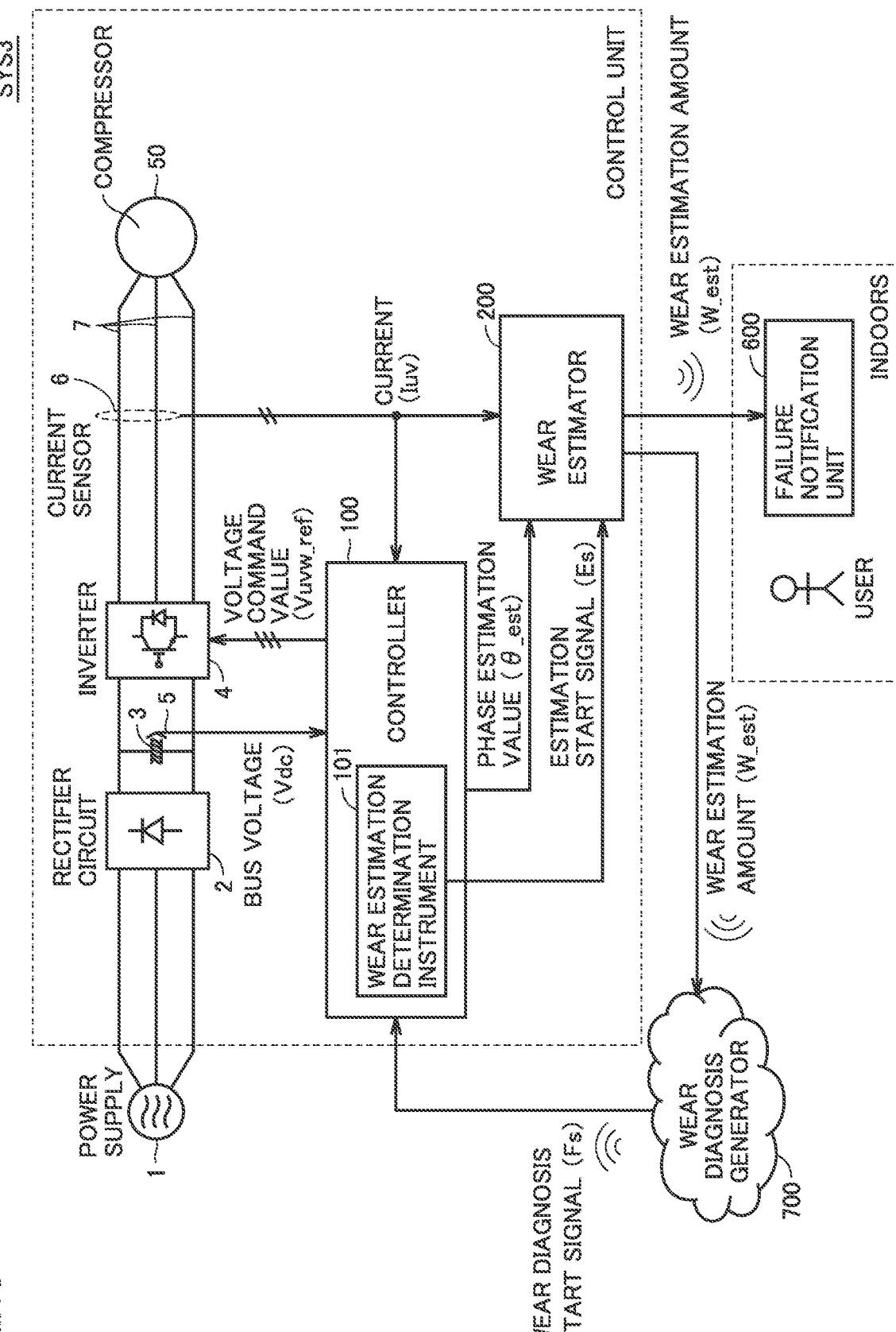
FIG. 18 is a block diagram for illustrating an exemplary configuration of a failure diagnosis system in a fifth embodiment.

In connection with the failure diagnosis systems in the embodiments described so far, a location where each constituent element is set is not particularly mentioned, however, for a failure diagnosis system in a fifth embodiment, a location where each constituent element is set will be described. FIG. 18 is a block diagram for illustrating an exemplary configuration of a failure diagnosis system SYS3 in the fifth embodiment. Features in the failure diagnosis system according to the fifth embodiment the same as those in failure diagnosis system SYS1 in the first embodiment and failure diagnosis system SYS2 in the third embodiment have the same reference numerals allotted and detailed description will not be repeated.

Initially, failure diagnosis system SYS3 is different from failure diagnosis system SYS1 in the first embodiment in function of a failure notification unit 600 and a wear diagnosis generator 700 and a method of transmission of a signal to other equipment. Specifically, in failure diagnosis system SYS3, for example, rectifier circuit 2, electrolytic capacitor 3, inverter 4, voltage sensor 5, current sensor 6, compressor 50, controller 100, and wear estimator 200 are provided in a control box outdoors (for example, on a rooftop of a building). The control box provided outdoors is defined as a control unit. Though not shown, the control unit includes a communication unit to transmit a signal indicating wear estimation amount W_est through a wire or wirelessly and to receive failure diagnosis start signal Fs through a wire or wirelessly. The control unit has the communication unit transmit wear estimation amount W_est to failure notification unit 600 and wear diagnosis generator 700. The control unit has the communication unit receive failure diagnosis start signal Fs from wear diagnosis generator 700.

Failure notification unit 600 is provided indoors (for example, in a control room). Though not shown, failure notification unit 600 includes a communication unit to receive a signal indicating wear estimation amount W_est from the control unit. Furthermore, failure notification unit 600 includes a display or the like on which a period of replacement of compressor 50 is shown to encourage a user to replace compressor 50 (see FIG. 8) based on received wear estimation amount W_est. Failure notification unit 600 is not limited to a terminal provided in an indoor space such as the control room but may be a portable terminal carried by a user. In order to use the portable terminal as failure notification unit 600, software equivalent in function to failure notification unit 600 should be installed therein in advance. By installation of the software in the portable terminal, the user can know the period of replacement of compressor 50 on the portable terminal. By thus providing the control unit and failure notification unit 600 at a distance from each other, even a user at a remote location can know the period of replacement of compressor 50 so long as the user is able to receive the signal indicating wear estimation amount W_est.

Wear diagnosis generator 700 may be provided, for example, in a server. Though not shown, wear diagnosis generator 700 provided in the server includes a communication unit to receive a signal indicating wear estimation amount W_est from the control unit and to transmit failure diagnosis start signal Fs to the control unit. Specifically, wear diagnosis generator 700 issues failure diagnosis start signal Fs to controller 100 every diagnosis period based on received wear estimation amount W_est. Wear diagnosis generator 700 may be provided in a server on the cloud. Failure diagnosis start signal Fs may be issued based on information from a user who knew a period of replacement of compressor 50. Furthermore, wear diagnosis generator 700 may be connected to communicate with a plurality of control units, and may transmit failure diagnosis start signal Fs to a control unit from which the signal indicating wear estimation amount W_est has been received, in accordance with a period of diagnosis by the control unit.

As set forth above, in failure diagnosis system SYS3 according to the fifth embodiment, failure notification unit 600 can communicate with wear estimator 200 and obtains through communication, wear estimation amount W_est of the bearing of the motor estimated by wear estimator 200. Thus, in failure diagnosis system SYS3, failure notification unit 600 can be provided at a position distant from motor 53 and timing of replacement of motor 53 can be known at a remote location.

It should be understood that the embodiments disclosed herein are illustrative and non-restrictive in every respect. The scope of the present disclosure is defined by the terms of the claims rather than the description above and is intended to include any modifications within the scope and meaning equivalent to the terms of the claims.

The invention claimed is:

1. A failure diagnosis apparatus to diagnose a failure of a motor to drive equipment, the failure diagnosis apparatus comprising:
   a controller to control drive of the motor;
   a wear estimator to estimate wear information of a bearing of the equipment; and
   a failure notification unit to diagnose a failure of the motor based on the wear information of the bearing of the equipment estimated by the wear estimator and to notify a user, wherein
   when the wear estimator estimates the wear information of the bearing of the equipment, the controller controls drive of the motor such that the motor is driven in a steady state,
   the wear estimator estimates the wear information of the bearing of the equipment from a first status variable representing a current that flows in the motor and at least one second status variable among variables each representing a status of the equipment based on an estimation model generated in training processing using a training data set, and
   the training data set includes a plurality of pieces of training data obtained by labeling the first status variable and the second status variable with the wear information of the bearing of the equipment obtained in advance.

2. The failure diagnosis apparatus according to claim 1, wherein
   the controller controls the motor to be driven at a constant rotation speed such that the motor is driven in a steady state.

3. The failure diagnosis apparatus according to claim 1, wherein
   the controller determines whether or not to control the motor to be driven in a steady state based on a calculated modulation factor.

4. The failure diagnosis apparatus according to claim 3, wherein
   when the calculated modulation factor is equal to or larger than 0.9 and smaller than 1.0, the controller controls the motor to be driven in a steady state.

5. The failure diagnosis apparatus according to claim 1, wherein
   the wear estimator includes a transform instrument to transform the first status variable and the second status variable into a predetermined frequency domain and to output the frequency domain as a frequency characteristic of the first status variable and the second status variable.

6. The failure diagnosis apparatus according to claim 1, wherein
   the equipment is a compressor,
   the motor to drive the compressor is connected to an inverter,
   the inverter outputs AC power through a bus to the motor,
   the first status variable represents a current that flows from the inverter to the motor, and
   the second status variable includes at least one of a pressure of refrigerant that flows in the compressor, a flow rate of the refrigerant, a temperature around the compressor, operating noise around the compressor, and a humidity around the compressor.

7. The failure diagnosis apparatus according to claim 1, further comprising a wear diagnosis generator to generate a signal indicating start of failure diagnosis to the controller based on the wear information estimated by the wear estimator.

8. The failure diagnosis apparatus according to claim 7, wherein
   the wear diagnosis generator generates a signal indicating start of failure diagnosis within a period shorter than a period which the user is notified of by the failure notification unit as information based on the wear information.

9. The failure diagnosis apparatus according to claim 1, wherein
   the failure notification unit notifies a user of timing of replacement of the bearing of the equipment based on the wear information of the bearing of the equipment estimated by the wear estimator.

10. The failure diagnosis apparatus according to claim 1, wherein
    the failure notification unit can communicate with the wear estimator and obtains through communication, the wear information of the bearing of the equipment estimated by the wear estimator.

11. A training method of training an estimation model for estimating wear information of a bearing of equipment to drive equipment, the estimation model estimating the wear information of the bearing of the equipment from a first status variable representing a current that flows in a motor and at least one second status variable among variables each representing a status of the equipment, the training method comprising:

obtaining a training data set including a plurality of pieces of training data obtained by labeling the first status variable and the second status variable with the wear information of the bearing of the equipment obtained in advance; and optimizing the estimation model with the obtained training data set such that a result of estimation is closer to the wear information of the bearing of the equipment for labeling.

12. A failure diagnosis system comprising:

a motor to drive equipment;

an inverter to supply electric power to the motor;

a controller to control drive of the motor by outputting a voltage command to the inverter;

a wear estimator to estimate wear information of a bearing of the equipment; and a failure notification unit to diagnose a failure of the motor based on the wear information of the bearing of the equipment estimated by the wear estimator and to notify a user, wherein when the wear estimator estimates the wear information of the bearing of the equipment, the controller controls drive of the motor such that the motor is driven in a steady state, the wear estimator estimates the wear information of the bearing of the equipment from a first status variable representing a current that flows in the motor and at least one second status variable among variables each representing a status of the equipment based on an estimation model generated in training processing using a training data set, and the training data set includes a plurality of pieces of training data obtained by labeling the first status variable and the second status variable with the wear information of the bearing of the equipment obtained in advance.

* * * * *